(12) United States Patent
Daigo

(10) Patent No.: US 8,437,024 B2
(45) Date of Patent: May 7, 2013

(54) PRINT CONTROLLING SYSTEM HAVING USAGE RESTRICTIONS FOR PRINT DATA STORED IN A PRINT MANAGING SERVER, PRINT CONTROLLING METHOD, AND PROGRAM

(75) Inventor: Atsushi Daigo, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 12/669,852

(22) PCT Filed: Sep. 19, 2008

(86) PCT No.: PCT/JP2008/067574
§ 371 (c)(1),
(2), (4) Date: Jan. 20, 2010

(87) PCT Pub. No.: WO2009/038228
PCT Pub. Date: Mar. 26, 2009

(65) Prior Publication Data
US 2010/0182640 A1 Jul. 22, 2010

(30) Foreign Application Priority Data
Sep. 21, 2007 (JP) .................................. 2007-246116

(51) Int. Cl.
G06F 15/00 (2006.01)
G06K 1/00 (2006.01)
G06F 3/12 (2006.01)
H04N 1/60 (2006.01)

(52) U.S. Cl.
USPC ........................... 358/1.15; 358/1.13; 358/1.9

(58) Field of Classification Search .................. None
See application file for complete search history.

(56) References Cited

U.S. PATENT DOCUMENTS

| 7,382,487 B2 * | 6/2008 | Ikegami .......................... 358/1.6 |
| 2003/0014368 A1 * | 1/2003 | Leurig et al. ...................... 705/64 |
| 2004/0117655 A1 * | 6/2004 | Someshwar ................... 713/201 |
| 2004/0190049 A1 * | 9/2004 | Itoh ............................... 358/1.15 |
| 2006/0044607 A1 * | 3/2006 | Kato ............................. 358/1.15 |
| 2006/0064753 A1 * | 3/2006 | Otake et al. ...................... 726/19 |

(Continued)

FOREIGN PATENT DOCUMENTS

| JP | 2005-004459 | 1/2005 |
| JP | 2006-099714 | 4/2006 |
| JP | 2007-030354 | 2/2007 |

OTHER PUBLICATIONS

International Preliminary Report on Patentability dated Mar. 24, 2010, in counterpart International Patent Application No. PCT/JP2008/067574.

*Primary Examiner* — Ming Hon
(74) *Attorney, Agent, or Firm* — Fitzpatrick, Cella, Harper & Scinto

(57) ABSTRACT

A printing apparatus for communication with a print managing apparatus is provided. The printing apparatus receives user input information, and based on the user input information, obtains list information on print data including print data identification information and list information on the user information from the print managing server. The printing apparatus selects print data to be output to another user from the print data indicated by the list information on the print data and further selects, from the list information on the user information, user information on the user which permits the selected print data to be output. The printing apparatus transmits, to the print managing server, the selected print data identification information and the selected user information to register the user identification information.

6 Claims, 21 Drawing Sheets

U.S. PATENT DOCUMENTS

| | | | |
|---|---|---|---|
| 2007/0070411 A1* | 3/2007 | Hiruma et al. | 358/1.15 |
| 2007/0103712 A1* | 5/2007 | Corona | 358/1.14 |
| 2008/0151293 A1* | 6/2008 | Narukawa | 358/1.15 |
| 2008/0168034 A1* | 7/2008 | Tsuchiya | 707/3 |
| 2009/0174894 A1* | 7/2009 | Kamijo | 358/1.15 |

* cited by examiner

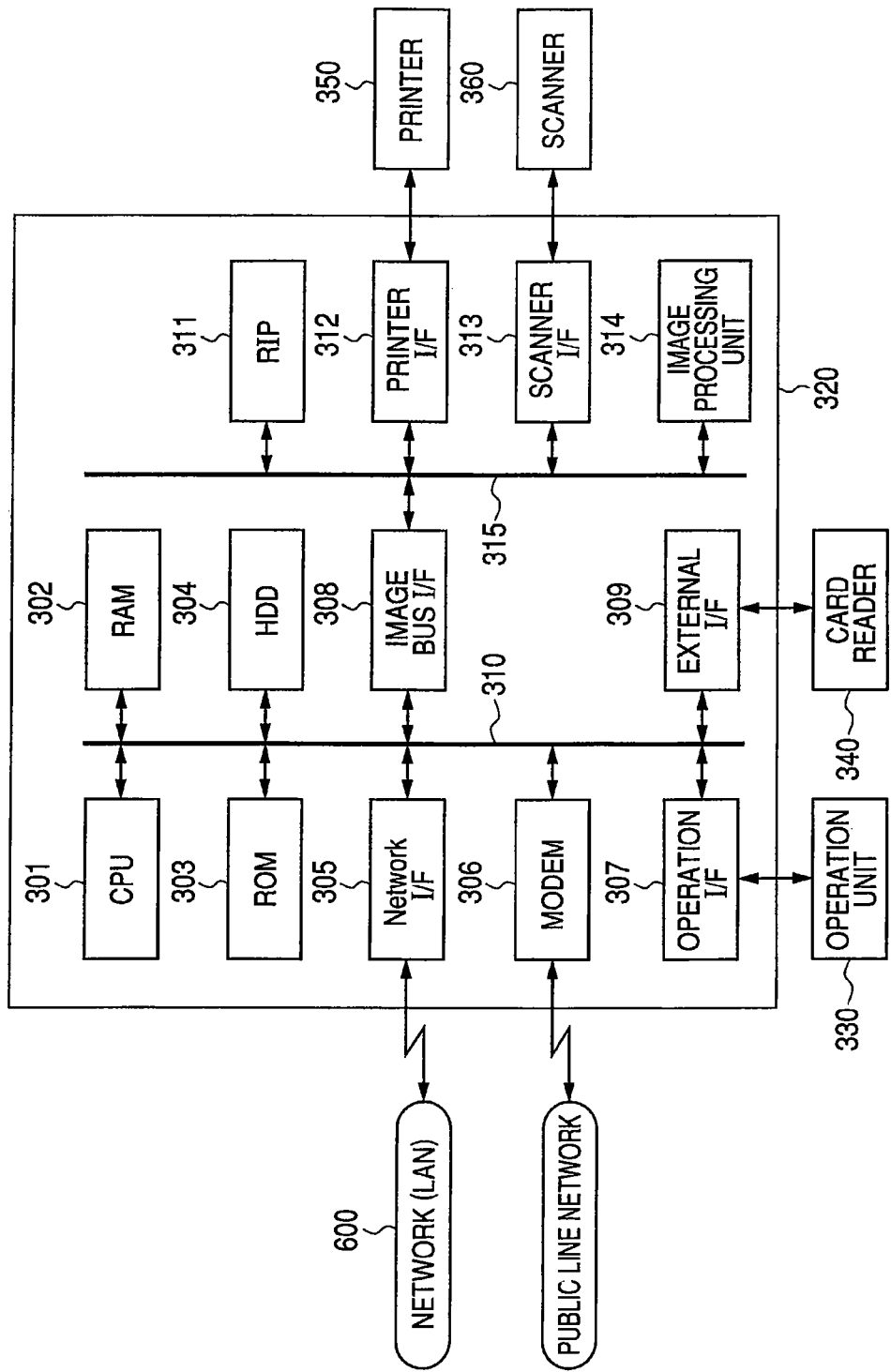

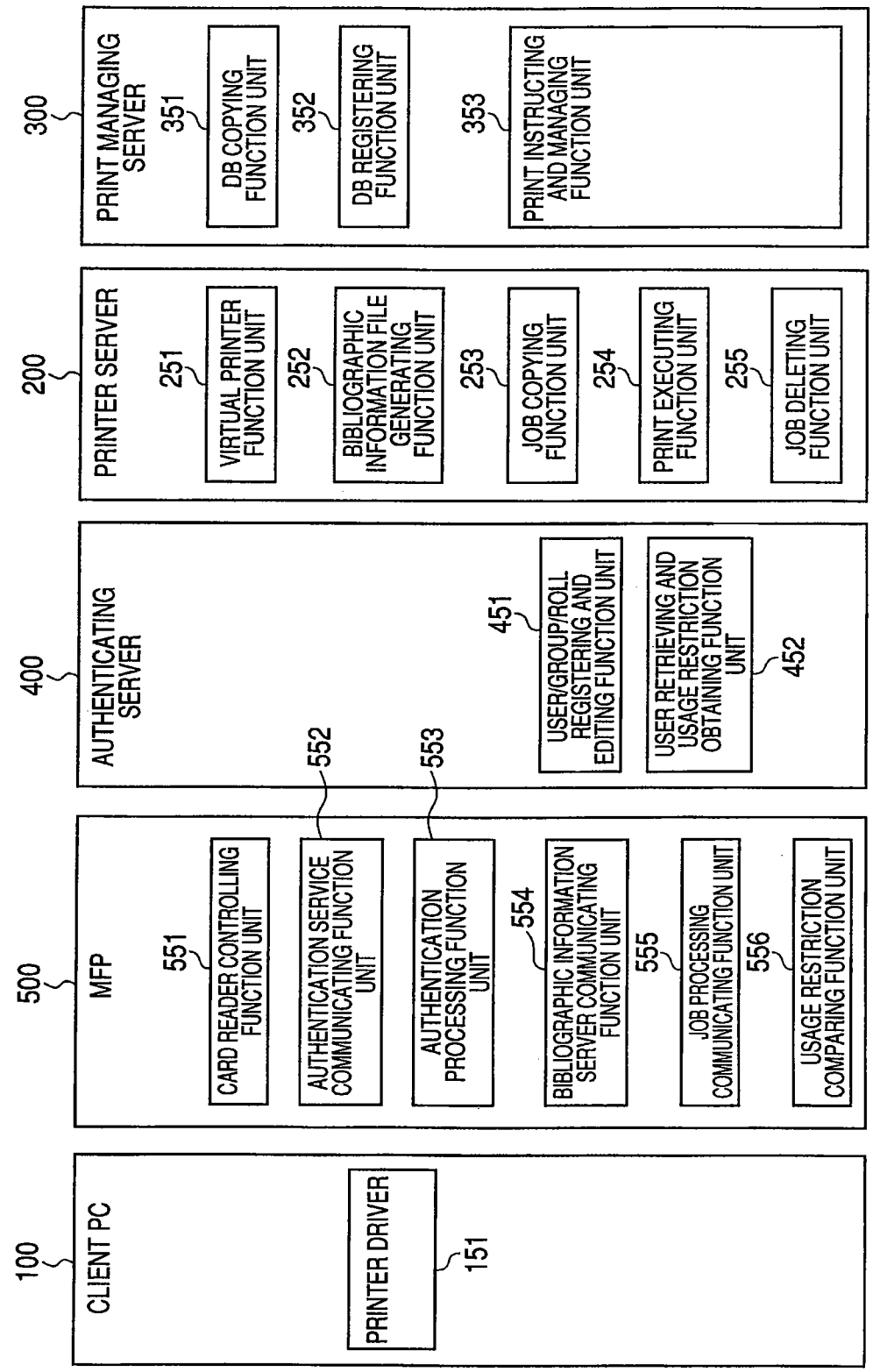

FIG. 5A

<BIBLIOGRAPHIC INFORMATION FILE>

| LOCATION | ITEM | EXAMPLE 1 |
|---|---|---|
| 1 | VERSION INFORMATION | V20 |
| 2 | LOG ON USER NAME | user1 |
| 3 | IP ADDRESS OF PRINT SERVER IN WHICH PRINT DATA (JOB) IS STORED | 192.168.0.1 |
| 4 | PRODUCT NAME (PRODUCT NAME IN CUE OF LPR SETTING) (OBTAINED FROM PRINT FILE NAME) | iRC4580 |
| 5 | DOCUMENT NAME | sample.txt - MEMO PAD |
| 6 | THE NUMBER OF COPIES (DESIGNATED TO PRINTER DRIVER WHEN PRINTING) | 1 |
| 7 | (PHYSICAL) THE NUMBER OF PAGES/COPY | 1 |
| 8 | PRINTING METHOD 0: SINGLE SIDE 1: BOTH SIDE | 1 |
| 9 | PAGE LAYOUT 1: 1in1  2: 1in2  4: 1in4 ..... | 2 |
| 10 | COLOR ATTRIBUTE 0: MONOCHROME, 1: COLOR | 0 |
| 11 | SHEET SIZE UNDEFINED=0, USER DEFINED=1, A0=2, A1=3, ... | 7 |
| 12 | PRINT FILE NAME EXAMPLE (¥spool¥PDL NAME ¥ PRINT DATA) | ¥spool¥cpca¥20070809141631293iRC4580_PDL6A1.cpca |

FIG. 5B

```
20070809141631293user_inf - MEMO PAD
FILE(F)  EDIT(E)  FORM(V)  DISPLAY(V)  HELP(H)
V20, user1, 192.168.0.1, iRC4580, sample.txt-MEMO PAD, 1, 1, 1, 2, 0, 7, ¥spool¥cpca¥20070809141631293iRC4580_PDL6A1.cpca
```

FIRST ROW, FIRST COLUMN

FIG. 6

<BIBLIOGRAPHIC INFORMATION>

| ITEM | EXAMPLE 1 (BEFORE TRANSFER) | EXAMPLE 2 (AFTER TRANSFER) |
|---|---|---|
| TIME STAMP (OBTAINED FROM PRINT FILE NAME OF BIBLIOGRAPHIC INFORMATION FILE) | 20070809141631293 | 20070810153023465 |
| DOCUMENT NAME | sample. txt – MEMO PAD | sample. txt – MEMO PAD |
| IP ADDRESS OF PRINT SERVER IN WHICH PRINT DATA (JOB) IS STORED | 192. 168. 0. 1 | 192. 168. 0. 1 |
| MONOCHROME GROUP | 00 | 00 |
| COLOR GROUP | C1 | C1 |
| JOB OWNER NAME | user1 | user2 |
| PAGE/COPY | 1 | 1 |
| SHEET SIZE | 7 | 7 |
| THE NUMBER OF COPIES | 1 | 1 |
| PRINTING METHOD | 1 | 1 |
| PAGE LAYOUT | 2 | 2 |
| COLOR ATTRIBUTE | 0 | 0 |
| ... | | |
| STATUS 0: NOT-PRINTED 1: PRINTING 2: DELETED 3: PRINTED | 0 | 0 (FIXED) |
| PRINT FILE NAME | ¥spool¥cpca¥20070809141631293 iRC4580_PDL6A1.cpca | ¥spool¥cpca¥20070810153023465 iRC4580_PDL6A1.cpca |
| TRANSFER SOURCE JOB OWNER NAME | — | user1 |

FIG. 8

<USER RESTRICTION INFORMATION>

| DEVICE FUNCTION | FUNCTION | | CONTROL CONDITION |
|---|---|---|---|
| DEVICE FUNCTION | PRINT | | PERMIT / NOT-PERMIT |
| | COPY | | PERMIT / NOT-PERMIT |
| | TRANSMIT | | PERMIT / NOT-PERMIT |
| | BOX | | PERMIT / NOT-PERMIT |
| | WEB BROWSER | | PERMIT / NOT-PERMIT |
| | UTILITY | | PERMIT / NOT-PERMIT |
| | OTHER | | PERMIT / NOT-PERMIT |
| COPYING FUNCTION | COLOR COPY | | NO RESTRICTION / FULL COLOR COPY IMPOSSIBLE / FULL COLOR/TWO COLORS COPY IMPOSSIBLE / ONLY MONOCHROME COPY POSSIBLE |
| | COPYING METHOD | | SINGLE SIDE COPY POSSIBLE / FORCED BOTH SIDES COPY |
| | PAGE LAYOUT | | NO RESTRICTION / ONE PAGE/SHEET IMPOSSIBLE / ONE TO TWO PAGES/SHEET IMPOSSIBLE |
| SCANNING FUNCTION | SCAN | | PERMIT / NOT-PERMIT |
| | COLOR SCAN | | PERMIT / NOT-PERMIT |
| ... | ... | | |
| PRINTING FUNCTION | PRINT | | PERMIT / NOT-PERMIT |
| | COLOR PRINT | | COLOR PRINT POSSIBLE / FORCED MONOCHROME PRINT |
| | PRINTING METHOD | | SINGLE SIDE PRINT POSSIBLE / FORCED BOTH SIDES PRINT |
| | PAGE LAYOUT | | NO RESTRICTION / ONE PAGE/SHEET IMPOSSIBLE / ONE TO TWO PAGES/SHEET IMPOSSIBLE |

| DOCUMENT NAME | COLOR ATTRIBUTE | PRINTING METHOD | LAYOUT | DATE/TIME |
|---|---|---|---|---|
| AAAAAAAA. doc [TANAKA] | Color | BOTH SIDES | 2in1 | 07/07/03 10:36 |
| BBBBB. txt | Color | SINGLE SIDE | 1in1 | 07/07/05 09:00 |
| http: //CCCCCCCCCCCC | Mono | SINGLE SIDE | 4in1 | 07/07/06 15:30 |

OOOO MR/MRS    OBTAIN LIST    OBTAIN PRINTED    ~1201

SELECT ALL | CANCEL SELECTION | DELETE | TRANSFER | PRINT

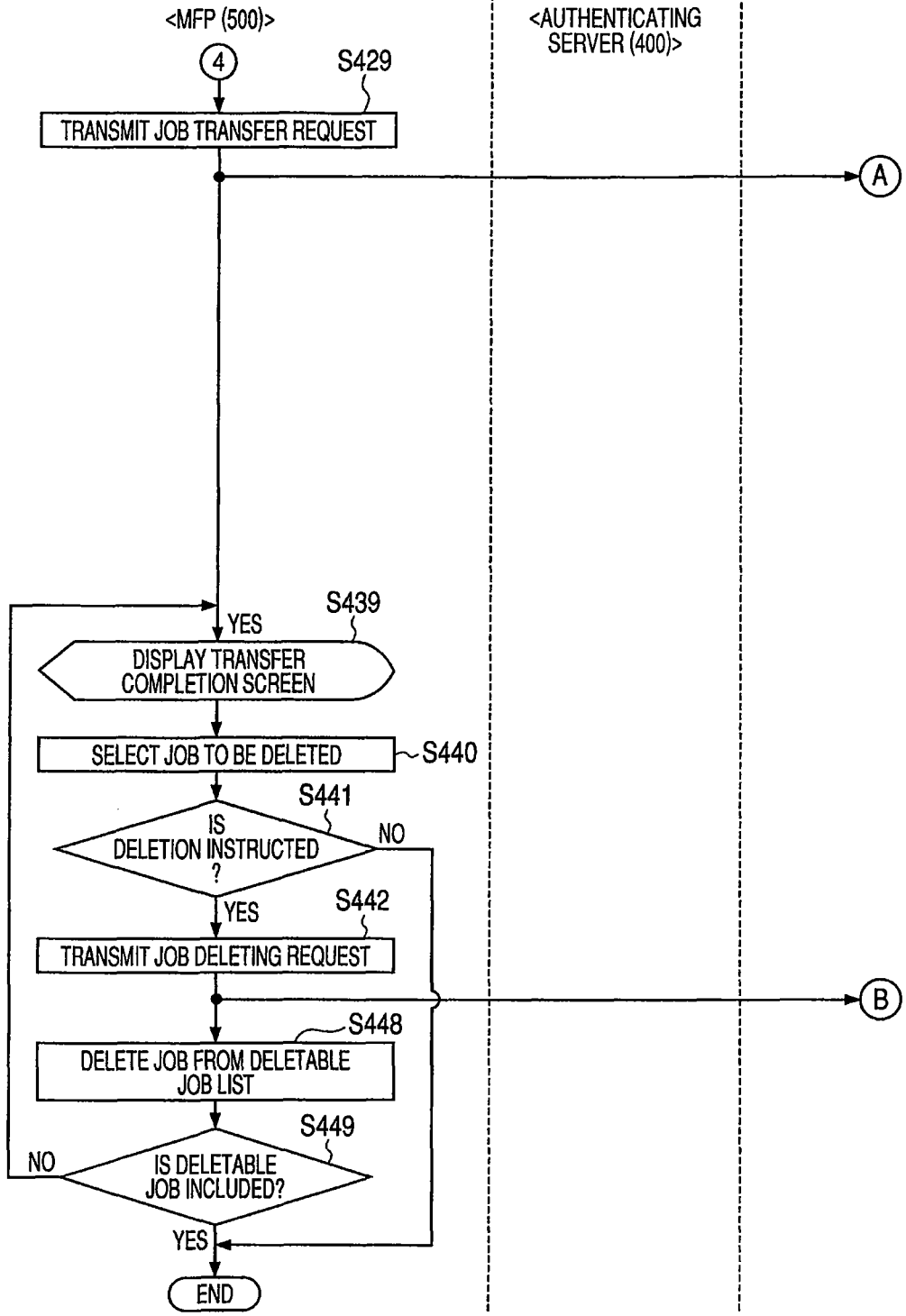

PRINT CONTROLLING SYSTEM HAVING USAGE RESTRICTIONS FOR PRINT DATA STORED IN A PRINT MANAGING SERVER, PRINT CONTROLLING METHOD, AND PROGRAM

TECHNICAL FIELD

The present invention relates to a network printing system.

BACKGROUND ART

In recent years, because of increasing public consciousness about security, security also has been emphasized for a composite machine (multifunctional peripheral, hereafter "MFP") which performs inputting and outputting of information throughout an office. Thus, security countermeasures that are the same as those of a personal computer (hereinafter, referred to as "PC"), have also become necessary for the MFP. To respond to such a desire, for example, Japanese Patent Application Laid-Open No. 2006-099714 discloses a print controlling system, in which the MFP is provided with an authenticating function, and the security is considered.

SUMMARY OF THE INVENTION

According to one aspect of the present invention, a printing apparatus communicates with a print managing server which stores print data, bibliographic information including user identification information about a user owning the print data and print data identification information for identifying the print data, and user information related to a plurality of the users. The printing apparatus receives user input information, obtains from the print managing server, according to the received user input information, list information about the print data including the print data identification information related to the print data which can be printed by the user corresponding to the user input information, and further obtains list information about the user information from the print managing server. The printing apparatus selects the print data to be printed to another user from the print data indicated by the list information about the obtained print data, and further selects, from the list information about the obtained user information, the user information about the user which permits the selected print data to be printed. The printing apparatus transmits, to the print managing server, the print data identification information about the selected print data and the selected user information to register the user identification information corresponding to the selected user information as the user identification information to which the selected print data can be printed.

Further features of the present invention will become apparent from the following description of exemplary embodiments with reference to the attached drawings.

BRIEF DESCRIPTION OF THE DRAWINGS

FIG. 3 is a block diagram illustrating an exemplary hardware configuration of an MFP illustrated in FIG. 1.

FIG. 4 is a block diagram illustrating an exemplary function configuration of each apparatus configured in the print controlling system according to the exemplary embodiment of the present invention.

FIGS. 5A and 5B are pattern diagrams illustrating an exemplary bibliographic information file generated in the print server.

FIG. 6 is a pattern diagram illustrating exemplary bibliographic information registered in a bibliographic information DB of the print managing server.

FIG. 8 is a pattern diagram illustrating exemplary user restriction information (roll) included in the user information.

FIG. 12 is a pattern diagram illustrating an exemplary job list screen displayed in an operation unit of the MFP.

BEST MODES FOR CARRYING OUT THE INVENTION

Exemplary embodiments of the present invention will be described below in detail as referring to the accompanying drawings.

Figure 1:
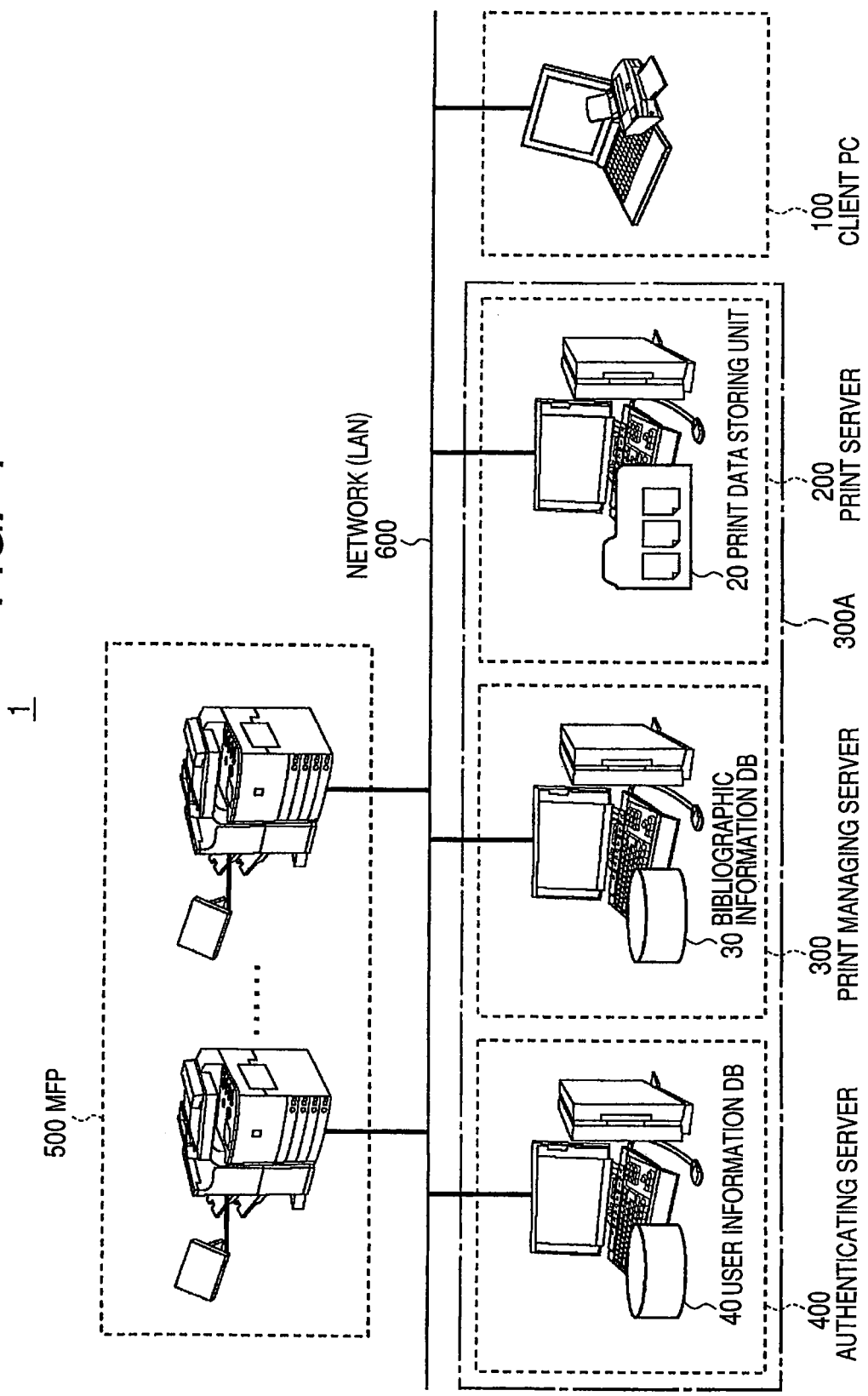
FIG. 1 is an external view illustrating an exemplary print controlling system according to an exemplary embodiment of the present invention.

FIG. 1 is an external view illustrating an exemplary print controlling system according to an exemplary embodiment of the present invention. As illustrated in FIG. 1, a print controlling system 1 of the present exemplary embodiment is configured with a client PC 100, a print server 200, a print managing server 300, an authenticating server 400, an MFP 500, and a network 600. Meanwhile, a plurality of the MFPs 500 may be connected to the network 600.

A printer driver is installed in the client PC 100, generates print data based on data received from an application program, and transmits the generated print data to the print server 200.

The print server 200 receives the print data (job) from the client PC 100 to store the received print data in a predetermined storage location (for example, a print data storing unit 20). After receiving the print data, the print server 200 analyzes bibliographic information on the received print data to generate a file (bibliographic information file) indicating the bibliographic information, and transmits the generated bibliographic information file to the print managing server 300. When the print managing server 300 requests the print server 200 to output the print data (job), the print server 200 transmits, with an LPR command, such print data (job) to the corresponding MFP 500. Further, according to an instruction of the print managing server 300, the print server 200 copies and deletes such a print data (job).

The print managing server 300 is provided with a bibliographic information database (bibliographic information DB) 30, and when the print server 200 stores the bibliographic information file in a predetermined storage location, the print managing server 300 reads a content of the bibliographic information file to store the read bibliographic information in the bibliographic information DB 30. From this point, the print managing server 300 is configured in a bibliographic information server. When the bibliographic information based on the content of the bibliographic information file is stored in the bibliographic information DB 30, the print managing server 300 deletes the stored bibliographic information file from the predetermined storage location. The print managing server 300 receives a variety of requests from the MFP 500, and according to the request, transmits list information on the print data (job), and copies the print data (job).

The authenticating server 400 is provided with a user information database (user information DB) 40 in which user information (including group information linked to a user, and user restriction information linked to the user) related to each user is stored. According to user input information (for example, a card number, or a user name and a password) transmitted from the MFP 500, the authenticating server 400 retrieves the user information database 40, and when the user information database 40 includes the corresponding user, the authenticating server 400 returns the user information on the corresponding user to the MFP 500.

Meanwhile, in the print controlling system 1 illustrated in FIG. 1, such a form is illustrated that the print server 200, the print managing server 300, and the authenticating server 400 are separately provided, however, the present invention is not limited to the above form. For example, the present invention can be also applied to such a form that one print managing server 300A is configured with the print server 200, the print managing server 300, and the authenticating server 400 illustrated in FIG. 1.

The MFP 500 is a printing apparatus including a printing function of, for example, a printer, an MFP, and a facsimile. Specifically, the MFP 500 print-outputs the print data (job) transmitted from the client PC 100 to the print server 200.

The network 600 connects each of the above apparatuses 100 to 500 to be able to communicate with each other, and is, for example, configured with the LAN (Local Area Network).

Figure 2:
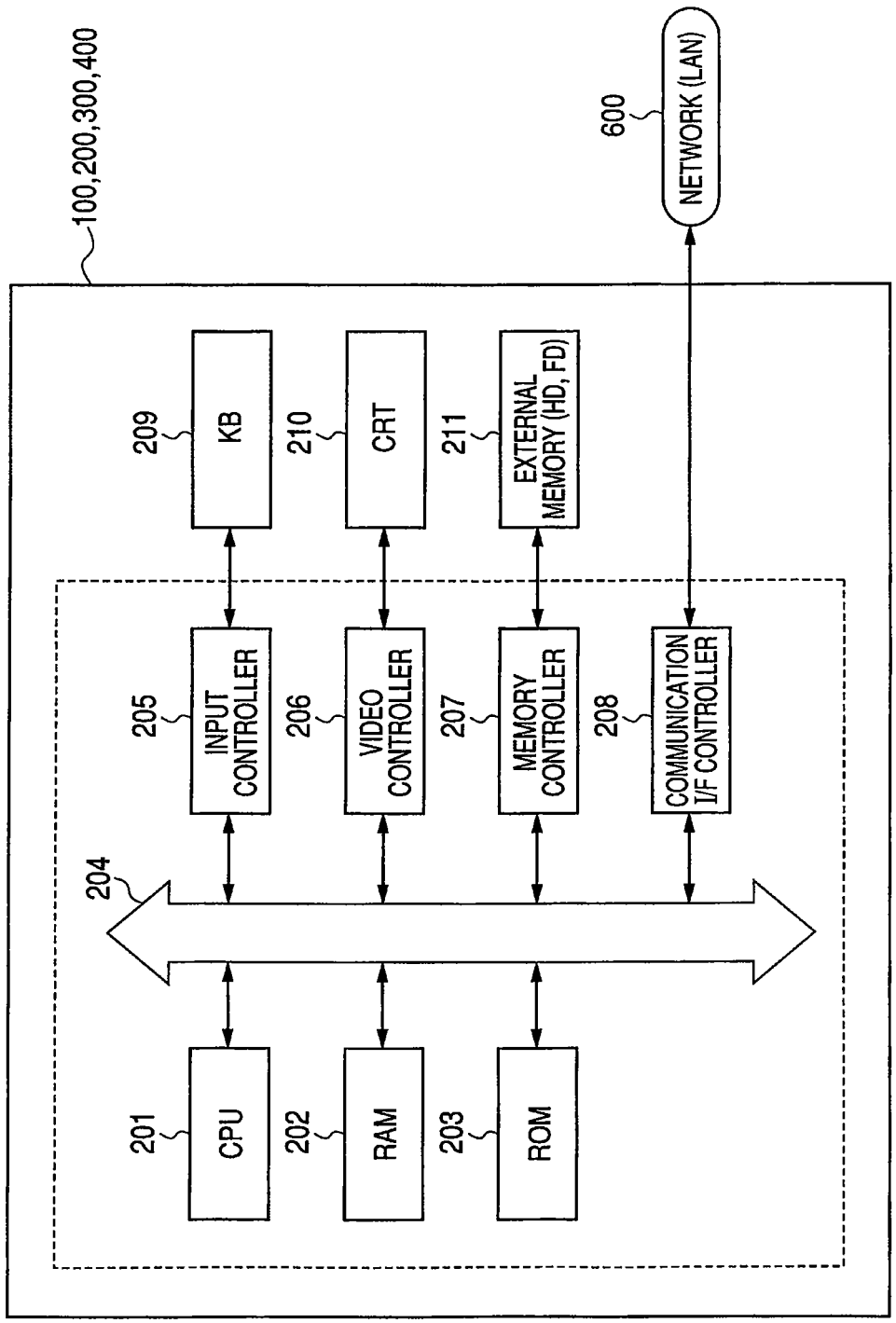
FIG. 2 is a block diagram illustrating an exemplary hardware configuration of a client PC, a print server, a print managing server, and an authenticating server illustrated in FIG. 1.

Next, a hardware configuration will be described, which can be applied to the client PC 100, the print server 200, the print managing server 300, and the authenticating server 400 illustrated in FIG. 1. FIG. 2 is a block diagram illustrating an example of the hardware configuration of the client PC 100, the print server 200, the print managing server 300, and the authenticating server 400 illustrated in FIG. 1.

As illustrated in FIG. 2, each of the client PC 100, the print server 200, the print managing server 300, and the authenticating server 400 is configured by including each piece of hardware of a CPU 201, a RAM 202, a ROM 203, a system bus 204, an input controller 205, a video controller 206, a memory controller 207, a communication interface (communication I/F) controller 208, a keyboard (KB) 209, a CRT display (CRT) 210, and an external memory 211.

The CPU 201 is a processor which totally controls each device and controller connected to the system bus 204. The ROM 203 or the external memory 211 stores a BIOS (Basic Input/Output System) and an operating system program (hereinafter, OS) which are control programs of the CPU 201, and a variety of programs which are necessary to realize a function executed by each apparatus.

The RAM 202 functions as a main memory, and a work area of the CPU 201. When executing a process, the CPU 201 loads the necessary program from the ROM 203 or the external memory 211 to the RAM 202, and executes the loaded program to realize a variety of operations.

The input controller 205 controls input from the keyboard (KB) 209 and a pointing device such as a not-illustrated mouse.

The video controller 206 controls a display to the CRT display (CRT) 210 which is a displaying apparatus. Meanwhile, while such an example is illustrated in FIG. 2 that the CRT display (CRT) is applied as the displaying apparatus, not only the CRT display (CRT) but also a liquid crystal display may be, for example, applied as the displaying apparatus. Such apparatuses are used by a manager according to necessity.

The memory controller 207 controls an access to the external memory 211 such as a hard disk (HD), a flexible disk (FD), or a Compact Flash (Registered trade mark) memory connected to a PMCIA card slot through an adapter storing a boot program, a variety of applications, font data, a user file, an edit file, and a variety of pieces of data.

The communication I/F controller 208 connects to an external apparatus through the network 600 to communicate with the external apparatus, and executes a communication controlling process for the network 600. For example, the communication I/F controller 208 can execute the communication using the TCP/IP. An area surrounded by a dash line of FIG. 2 is, for example, an area in which a controller unit is configured.

Meanwhile, the CPU 201 executes, for example, a developing (rasterizing) process for an outline font to a display information area in the RAM 202 to enable the outline font to be displayed on the CRT display (CRT) 210. The CPU 201 can receive an instruction from a user through a not-illustrated mouse cursor displayed on the CRT display (CRT) 210.

Meanwhile, in the present exemplary embodiment, it is assumed that the program realizing the present invention is recorded in the external memory 211, and, according to necessity, is loaded to the RAM 202 to be executed by the CPU 201. In addition, it is assumed that a definition file and a variety of information tables, which are used when the above program is executed, are also recorded in the external memory 211. In addition, it is assumed that each of the print data storing unit 20 of the print server 200, the bibliographic information DB 30 of the print managing server 300, and the user information DB 40 of the authenticating server 400 which are illustrated in FIG. 1 is configured in the external memory 211 of each apparatus.

Next, a hardware configuration applicable to the MFP 500 illustrated in FIG. 1 will be described. FIG. 3 is a block diagram illustrating an example of the hardware configuration of the MFP 500 illustrated in FIG. 1.

As illustrated in FIG. 3, the MFP 500 is configured by including each hardware configuration of a controller unit 320, an operation unit 330, a card reader 340, a printer 350, and a scanner 360.

The controller unit 320 is configured by including each hardware configuration of a CPU 301, a RAM 302, a ROM 303, a hard disk drive (HDD) 304, a network interface (Network_I/F) 305, a modem (MODEM) 306, an operation unit interface (operation unit I/F) 307, an image bus interface (IMAGE_BUS_I/F) 308, an external interface (external I/F) 309, a system bus 310, a raster image processor (RIP) 311, a printer interface (printer I/F) 312, a scanner interface (scanner I/F) 313, an image processing unit 314, and an image bus 315.

The controller unit 320 is connected to the scanner 360 functioning as an image inputting device, and the printer 350 functioning as an image outputting device, on the other hand, the controller unit 320 is connected to the network (LAN) 600, or, for example, a public line network (WAN) such as the PSTN or the ISDN, and thereby, inputs and outputs image data and device information.

The CPU 301 is a processor which totally controls each device connected to the system bus 310 and the image bus 315.

The RAM 302 is a work memory which is used for the CPU 301 to operate, and also includes functions of a program memory for recording a program, and an image memory for temporarily recording image data.

The ROM 303 stores the boot program of the system and a variety of control programs. The HDD 304 stores a variety of programs for controlling the system, and the image data.

The Network I/F 305 is connected to the network (LAN) 600 to input and output data. The MODEM 306 is connected to the public line network to input and output data, which is transmitted and received in the FAX, and the like.

The operation unit I/F 307 is an interface of the operation unit 330 which is a user interface (UI), and outputs the image data to be displayed on the operation unit 330 to the operation unit 330. The operation unit I/F 307 plays a role for transferring information (for example, user input information), which is inputted by a user of the present system from the operation unit 330, to the CPU 301. Meanwhile, the operation unit 330 is provided with a displaying unit including a touch panel, and since the user pushes down (touch with a finger) a button displayed on the displaying unit, a variety of instructions can be issued.

The IMAGE_BUS_I/F 308 is a bus bridge for connecting the system bus 310 and the image bus 315 which transfers the image data at a high rate, and converting a data structure.

The external I/F 309 is an interface which receives an external input such as the USB, the IEEE 1394, the printer port, and the RS-232C. In the present exemplary embodiment, the external I/F 309 is connected to the card reader 340 for reading information on an IC card, which is necessary to authenticate the IC card. The CPU 301 controls, through the external I/F 309, the card reader 340 to read the information from the IC card, and can obtain the information read from such an IC card.

The above devices denoted by reference numerals 301 to 309 are arranged on the system bus 310, and can communicate with each other.

The RIP 311 develops, for example, vector data such as the PDL code to a bit map image.

The printer I/F 312 connects the printer 350 and the controller unit 320, and converts the image data from a synchronous system to an asynchronous system.

The scanner I/F 313 connects the scanner 360 and the controller unit 320, and converts the image data from the synchronous system to the asynchronous system.

The image processing unit 314 executes a compensating process, a fabricating process, and an editing process for input image data, and executes a compensating process, and a resolution converting process of a printer for print output image data. In addition to such processes, the image processing unit 314 executes a rotating process for the image data, and executes a compressing and expanding process such as the JPEG for multiple-value image data, and the JBIG, the MMR, and the MH for binary image data.

The above devices denoted by reference numerals 308, 311 to 314 are arranged on the image bus 315, and can communicate with each other. The image bus 315 is, for example, configured with the PCI bus or the IEEE1394.

Specifically, the operation unit 330 includes an LCD displaying unit, a touch panel sheet is applied on the LCD displaying unit, the LCD displaying unit displays an operation screen of the present system, and when a key (button) on the displayed operation screen is pushed, position information on the key is transferred to the CPU 301 through the operation unit I/F 307. As a variety of operation keys, the operation unit 330 is provided with keyboard functions such as a start key, a stop key, an ID key, and a reset key.

Here, the start key of the operation unit 330 is, for example, operated when it is started to read a draft image. A central part of the start key includes, for example, two colors of green and red LEDs, and the light emission of each color indicates whether or not the start key can be used. The stop key of the operation unit 330 is, for example, operated when a running operation is stopped. The ID key of the operation unit 330 is, for example, operated when a user ID of a user is inputted. The reset key of the operation unit 330 is, for example, operated when the setting by the operation unit 330 is initialized.

The card reader 340 reads information stored in the IC card (for example, the FeliCa (registered trade mark) of Sony Corporation) by the control from the CPU 301. The information read by the card reader 340 is notified to the CPU 301 through the external I/F 309.

The printer 350 converts, for example, raster image data as an image on a sheet. The converting method corresponds to an electro-photographic method for using a photoconductive drum and a photoreceptor belt, and an inkjet method for discharging ink from a micro nozzle array and directly printing the image on the sheet, and any one of the converting methods may be used. The print operation of the printer 350 is started by an instruction from the CPU 301. Meanwhile, the printer 350 includes a plurality of paper-feeding stages so that a different sheet size or a different sheet direction can be selected, and a sheet cassette corresponding to each paper-feeding stage is provided.

The scanner 360 illuminates an image on a sheet which is a draft, scans the draft by using a CCD line sensor, and thereby, converts the image of the draft to an electronic signal as the raster image data. The draft sheet is set to a tray of a draft feeder, and the user of the MFP 500 instructs, from the operation unit 330, a starting operation for reading the draft, thereby, the CPU 301 instructs the scanner 360, and the feeder feeds the draft sheet one by one, and the image of the draft is read.

Because of the above configuration, the MFP 500 can transmit the image data read from the scanner 360 on the network (LAN) 600, and can print-output, with the printer 350, the print data received from the network (LAN) 600. The MFP 500 can also FAX-transmit the image data read from the scanner 360 from the MODEM 306 on the public line network, and can also print-output, with the printer 350, the image data FAX-received from the public line network.

Next, a function configuration of each apparatus configured in the print controlling system 1 illustrated in FIG. 1 will be described. FIG. 4 is a block diagram illustrating an example of the function configuration of each apparatus configured in the print controlling system according to the exemplary embodiment of the present invention.

As illustrated in FIG. 4, the client PC 100 includes a printer driver 151 as a function configuration. Here, the printer driver 151 is, for example, configured with the programs stored in the CPU 201 of the client PC 100 and the external memory 211 of the client PC 100 which are illustrated in FIG. 2.

The printer driver 151 generates the print data based on the data received from the application program, and transmits the generated print data to the print server 200.

As illustrated in FIG. 4, the print server 200 includes, as the function configuration, a virtual printer function unit 251, a bibliographic information file generating function unit 252, a job copying function unit 253, a print executing function unit 254, and a job deleting function unit 255. Here, each of the above function units denoted by reference numerals 251 to 255 is, for example, configured with the programs stored in the CPU 201 of the print server 200 and the external memory 211 of the print server 200 which are illustrated in FIG. 2.

The virtual printer function unit 251 receives the print data (job) transmitted from the printer driver 151 of the client PC 100, and stores the received print data (job) in a predetermined storage location (for example, the print data storing unit 20 configured in the external memory 211). In such a case, the print data (job) is stored as a file with a hidden attribute in the print data storing unit 20.

The bibliographic information file generating function unit 252 monitors the print data storing unit 20 in which the print data (job) is stored by the virtual printer function unit 251, and when the print data storing unit 20 includes the file with the hidden attribute, the bibliographic information file generating function unit 252 recognizes such a file as the print data (job), and analyzes the bibliographic information. The bibliographic information file generating function unit 252 generates a bibliographic information file, in which a variety of pieces of the bibliographic information are described, based on the analyzed bibliographic information, and transmits the generated bibliographic information file to the print managing server 300. In the print data (job) in which the analysis of the bibliographic information is completed, the hidden attribute is removed by the bibliographic information file generating function unit 252.

FIGS. 5A and 5B are pattern diagrams illustrating an example of the bibliographic information file generated in the print server 200. FIG. 5A illustrates, as an example 1, an exemplary content of the bibliographic information file in each item of version information, log on user name, IP address of the print server at which the print data (job) is stored, product name, document name, the number of copies, the number of pages/copy, printing method, page layout, color attribute, sheet size, and print file name. FIG. 5B illustrates a setting image of the bibliographic information file illustrated in FIG. 5A.

The job copying function unit 253 illustrated in FIG. 4 generates a copy of the print data of the corresponding job based on a job copying request transferred from the print managing server 300. The print data generated in such a case does not include the hidden attribute.

The print executing function unit 254 issues the LPR command for executing a printing process based on a printing instruction transferred from the print managing server 300.

The job deleting function unit 255 deletes the print data of the corresponding job based on a job deleting request transferred from the print managing server 300.

As illustrated in FIG. 4, the print managing server 300 includes, as the function configuration, a DB copying function unit 351, a DB registering function unit 352, and a print instructing and managing function unit 353. Here, each of the above function units denoted by reference numerals 351 to 353 is, for example, configured with the programs stored in the CPU 201 of the print managing server 300 and the external memory 211 of the print managing server 300 which are illustrated in FIG. 2.

The DB copying function unit 351 copies the bibliographic information in the bibliographic information DB 30 held in the print managing server 300.

The DB registering function unit 352 monitors a predetermined storage location of the print managing server 300, in which the bibliographic information file transmitted from the bibliographic information file generating function unit 252 of the print server 200 is stored, and when the bibliographic information file is stored in the predetermined storage location, the DB registering function unit 352 registers, as the bibliographic information, a content described in the stored bibliographic information file in the bibliographic information DB 30. The DB registering function unit 352 deletes the bibliographic information file related to the bibliographic information stored in the bibliographic information DB 30 from the predetermined storage location.

FIG. 6 is a pattern diagram illustrating an example of the bibliographic information registered in the bibliographic information DB 30 of the print managing server 300. FIG. 6 illustrates an exemplary content of the bibliographic information in each item of time stamp, document name, IP address of the print server at which the print data (job) is stored, monochrome group, color group, job owner name, the number of pages/copy, sheet size, the number of copies, printing method, page layout, status, print file name, and transfer source job owner name. Here, an example 1 illustrates an example of the bibliographic information before transfer, and an example 2 illustrates an example of the transferred bibliographic information copied when the bibliographic information is transferred. Here, the time stamp is print data (job) identification information for uniquely identifying the corresponding print data (job). The monochrome group and the color group are identification information for uniquely identifying the MFP 500.

When the bibliographic information file illustrated in the example 1 of FIG. 5A is transmitted from the bibliographic information file generating function unit 252 of the print server 200, based on the corresponding bibliographic information file, the DB registering function unit 352 registers, for example, the bibliographic information illustrated in the example 1 of FIG. 6 in the bibliographic information DB 30. In such a case, the DB registering function unit 352 registers the log on user name of the bibliographic information file as a job owner name of the bibliographic information. When the print data (job) is transferred, as illustrated in FIG. 6, the DB registering function unit 352 arbitrarily changes and registers the time stamp, the job owner name, the status, the print file name, and the transfer source job owner name.

The print instructing and managing function unit 353 illustrated in FIG. 4 receives a request, such as a job list obtaining request, a job transferring request, and the job deleting request, from the MFP 500, and processes such requests. Specifically, when the job list obtaining request is issued, the print instructing and managing function unit 353 retrieves the job, which can be output by the corresponding user, from the bibliographic information DB 30, and transmits a result of the retrieval to the MFP 500. When the job transferring request is issued, the print instructing and managing function unit 353 transmits the job copying request to the print server 200, and also transmits a DB copying request to the DB copying function unit 351. When the job deleting request is issued, the print instructing and managing function unit 353 transmits the job deleting request to the print server 200.

As illustrated in FIG. 4, the authenticating server 400 includes, as the function configuration, a user/group/roll/registering and editing function unit 451, and a user retrieving and usage restriction obtaining function unit 452. Here, each of the above function units denoted by the reference numerals 451 and 452 is, for example, configured with the program stored in the CPU 201 of the authenticating server 400 and the external memory 211 of the authenticating server 400 which are illustrated in FIG. 2.

The user/group/roll/registering and editing function unit 451 registers and edits the user information managed by the user information DB 40 of the authenticating server 400.

The user retrieving and usage restriction obtaining function unit 452 receives a request from an after-mentioned authentication service communicating function unit 552 of the MFP 500, and retrieves the corresponding user information from the user information DB 40 holding the user information.

Figures 7A, 7B:
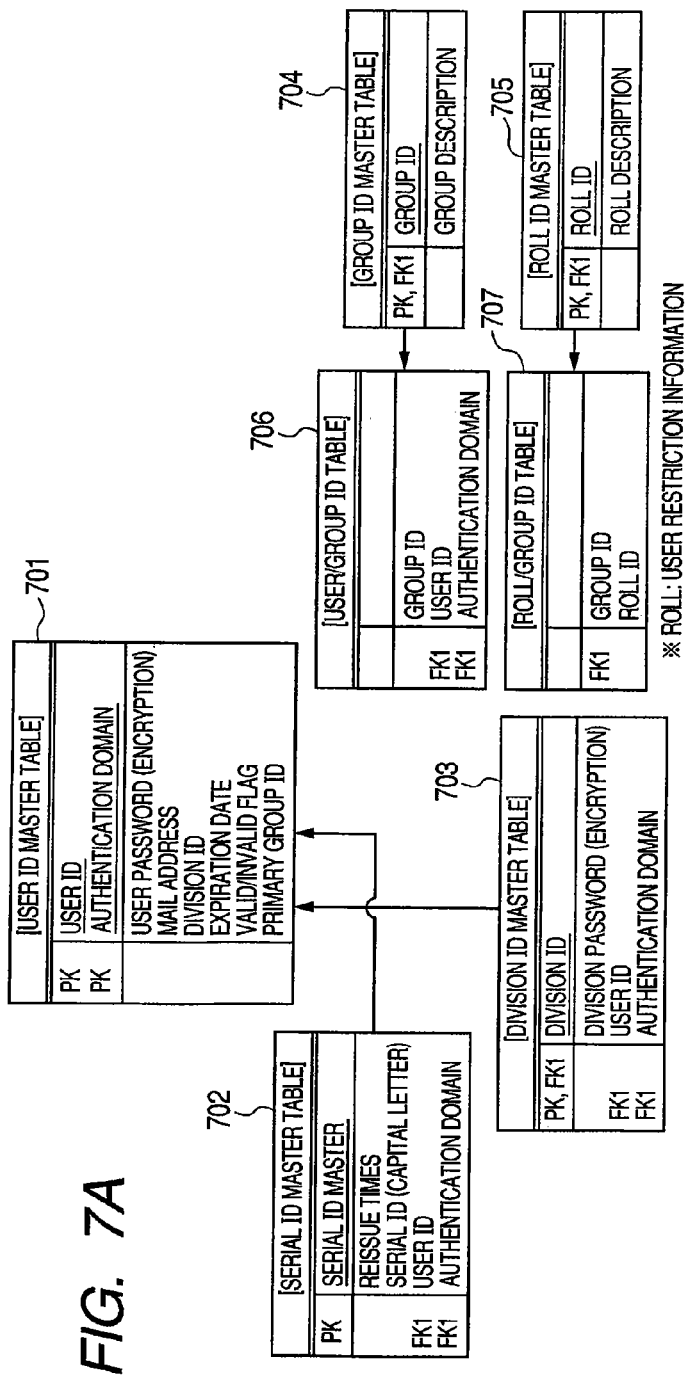
FIGS. 7A and 7B are pattern diagrams illustrating exemplary user information registered in a user information DB of the authenticating server.

FIGS. 7A and 7B are pattern diagrams illustrating an example of the user information registered in the user information DB 40 of the authenticating server 400. Here, FIG. 7A illustrates each table configured in the user information, and FIG. 7B illustrates a content of each table illustrated in FIG. 7A.

As illustrated in FIG. 7A, the user information is configured by including a user ID master table 701, a serial ID master table 702, a division ID master table 703, a group ID master table 704, a roll ID master table 705, a user/group ID table 706, and a roll/group ID table 707. Here, the roll corresponds to user restriction information.

FIG. 8 is a pattern diagram illustrating an example of the user restriction information (roll) included in the user information. As illustrated in FIG. 8, in the user restriction information (roll), each function is set, which includes a device function 801, a copying function 802, a scanning function 803, and a printing function 804.

Further, in the device function 801, functions of print, copy, transmit, box, web browser, utility, and other are set, and a restriction condition is set for each of such functions. In the copying function 802, functions of color copy, copying method, and page layout are set, and a restriction condition is set for each of such functions. In the scanning function 803, functions of scan and color scan are set, and a restriction condition is set for each of such functions. In the printing function 804, functions of print, color print, printing method, and page layout are set, and a restriction condition is set for each of such functions.

As illustrated in FIG. 4, the MFP 500 includes, as the function configuration, a card reader controlling function unit 551, an authentication service communicating function unit 552, an authentication processing function unit 553, a bibliographic information server communicating function unit 554, a job processing function unit 555, and a usage restriction comparing function unit 556. Here, each of the above function units denoted by reference numerals 551 to 555 is, for example, configured with the programs stored in the CPU 301 of the MFP 500 and the ROM 303 or the HDD 304 of the MFP 500 which are illustrated in FIG. 3. The card reader controlling function unit 551, the authentication service communicating function unit 552, and the authentication processing function unit 553 corresponds to a function group necessary for an authenticating process.

The card reader controlling function unit 551 controls the communication with the card reader 340 connected to the MFP 500 through the external I/F 309. When the IC card is held over the card reader 340, and card information on such an IC card is read, the card reader controlling function unit 551 obtains the card information (for example, card production number) necessary for the authentication from the card reader 340, and transfers the obtained card information to the authentication service communicating function unit 552.

The authentication service communicating function unit 552 obtains the card information from the card reader controlling function unit 551, and transmits an obtaining request, that is, an authenticating request for the user information corresponding to the obtained card information to the user retrieving and usage restriction obtaining function unit 452 of the authenticating server 400. After the user information is obtained, the authentication service communicating function unit 552 transmits the obtained user information to the authentication processing function unit 553.

The authentication processing function unit 553 executes a process (log on process) for notifying a main box of the MFP 500 of the user information obtained from the authentication service communicating function unit 552. That is, the authentication processing function unit 553 executes the authenticating process based on the user information obtained from the authentication service communicating function unit 552.

The bibliographic information server communicating function unit (print managing server communicating function unit) 554 transmits a variety of commands such as a printing request, a transferring request, and a deleting request to the print instructing and managing function unit 353 of the print managing server 300, and receives a return for a variety of the transmitted commands from the print managing server 300.

The job processing function unit 555 processes the job which is to be processed in an job list displaying process, a job transferring process, and a job outputting process which will be described later.

The usage restriction comparing function unit 556 compares the print data (job) selected by the user with the user restriction information, and determines whether or not such print data (job) can be output.

Next, a procedure of the print controlling system 1 of the present exemplary embodiment will be described.

Figure 9:
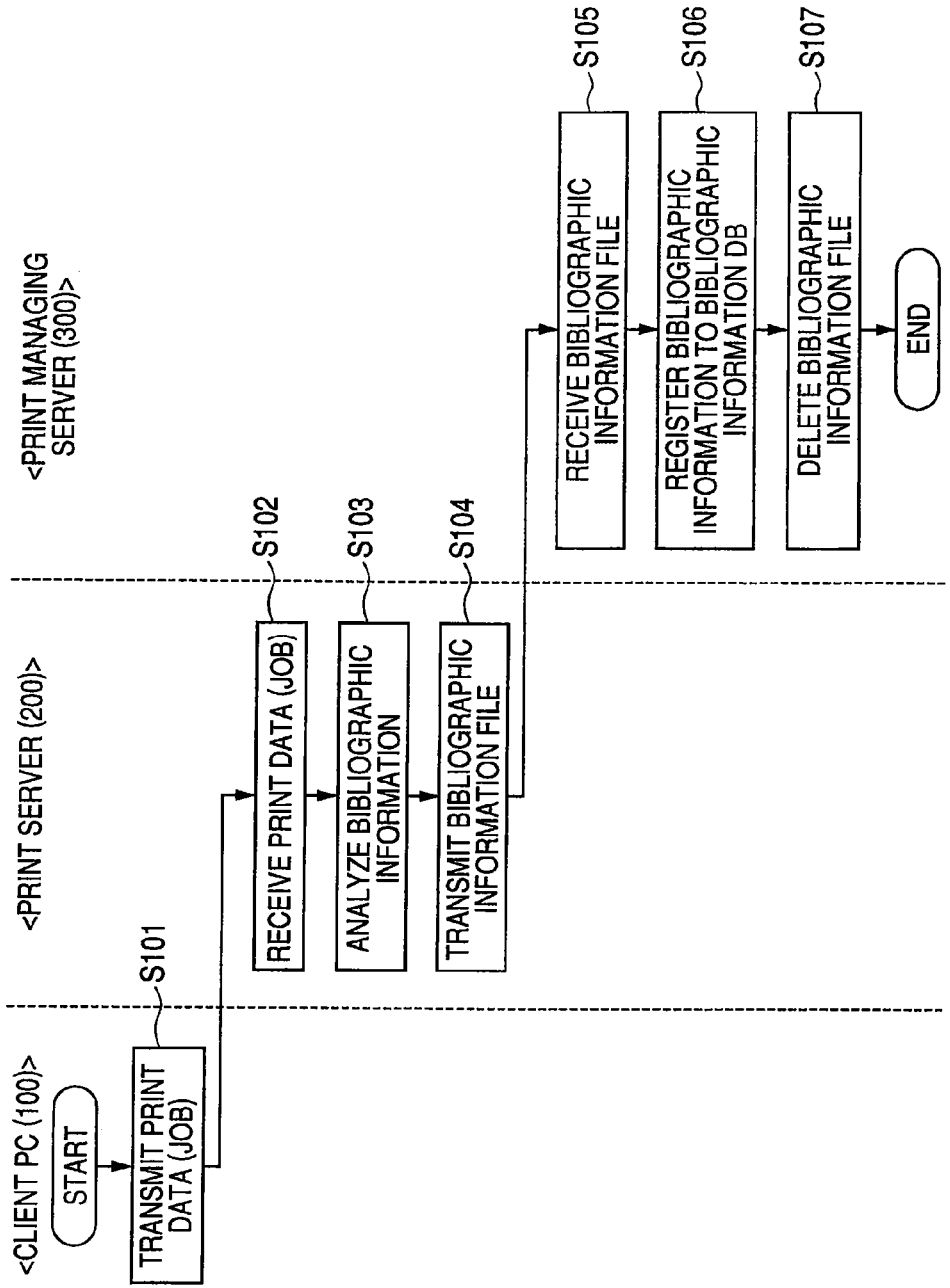
FIG. 9 is a flowchart illustrating an exemplary procedure when a printing instruction is issued from the client PC in the print controlling system according to the exemplary embodiment of the present invention.

FIG. 9 is a flowchart illustrating an exemplary procedure when the printing instruction is issued from the client PC in the print controlling system according to the exemplary embodiment of the present invention. Here, in the flowchart illustrated in FIG. 9, the processes in the client PC 100, the print server 200, and the print managing server 300 are illustrated as vertically-separated.

First, when the printing instruction is issued by the user, at step S101, the printer driver 151 of the client PC 100 transmits the print data (job) based on such a printing instruction to the print server 200.

Next, at step S102, the virtual printer function unit 251 of the print server 200 receives the print data (job) transmitted at step S101 from the client PC 100. After that, the virtual printer function unit 251 stores the received print data (job) in a predetermined storage location (for example, the print data storing unit 20 configured in the external memory 211). In such a case, the print data (job) is stored as a file provided with the hidden attribute in the print data storing unit 20.

Next, at step S103, the bibliographic information file generating function unit 252 of the print server 200 monitors the print data storing unit 20 in which the print data (job) is stored by the virtual printer function unit 251, detects such a case that the print data with the hidden attribute is stored in the print data storing unit 20, and analyzes the bibliographic information on such print data. The bibliographic information file generating function unit 252 generates the bibliographic information file illustrated in FIGS. 5A and 5B based on the analyzed bibliographic information. In addition, the bibliographic information file generating function unit 252 deletes the hidden attribute of the print data (job) in which it is completed to analyze the bibliographic information.

Next, at step S104, the bibliographic information file generating function unit 252 of the print server 200 transmits the bibliographic information file generated at step S103 to the print managing server 300.

Next, at step S105, the DB registering function unit 352 of the print managing server 300 receives the bibliographic information file transmitted from the bibliographic information file generating function unit 252 of the print server 200, and stores the received bibliographic information file in a predetermined storage location of the print managing server 300.

Next, at step S106, when receiving the bibliographic information file at step S105, and storing the received bibliographic information file in the predetermined storage location, the DB registering function unit 352 of the print managing server 300 stores and register the bibliographic information in the bibliographic information DB 30 according to a content described in the received bibliographic information file. Here, the bibliographic information registered in the bibliographic information DB 30 corresponds to, for example, the bibliographic information illustrated in FIG. 6.

Next, at step S107, the DB registering function unit 352 of the print managing server 300 deletes the bibliographic information file related to the bibliographic information registered in the bibliographic information DB 30 from the predetermined storage location. After that, the process for the corresponding flowchart is completed.

Through the above processes of step S101 to step S107, the print data (job) transmitted from the client PC 100 is stored, and the bibliographic information on such print data (job) is stored. Meanwhile, in the exemplary embodiment of the present invention, the print managing server 300 receives the bibliographic information file (S105), and registers the bibliographic information file in the bibliographic information DB 30 (S106), however, by transmitting the bibliographic information file from the print server 200 by the SMB (Server Message Block) transmission, the bibliographic information may be also registered in the bibliographic information DB 30. In addition to the SMB transmission, other transmission protocol may be used.

Figure 10:
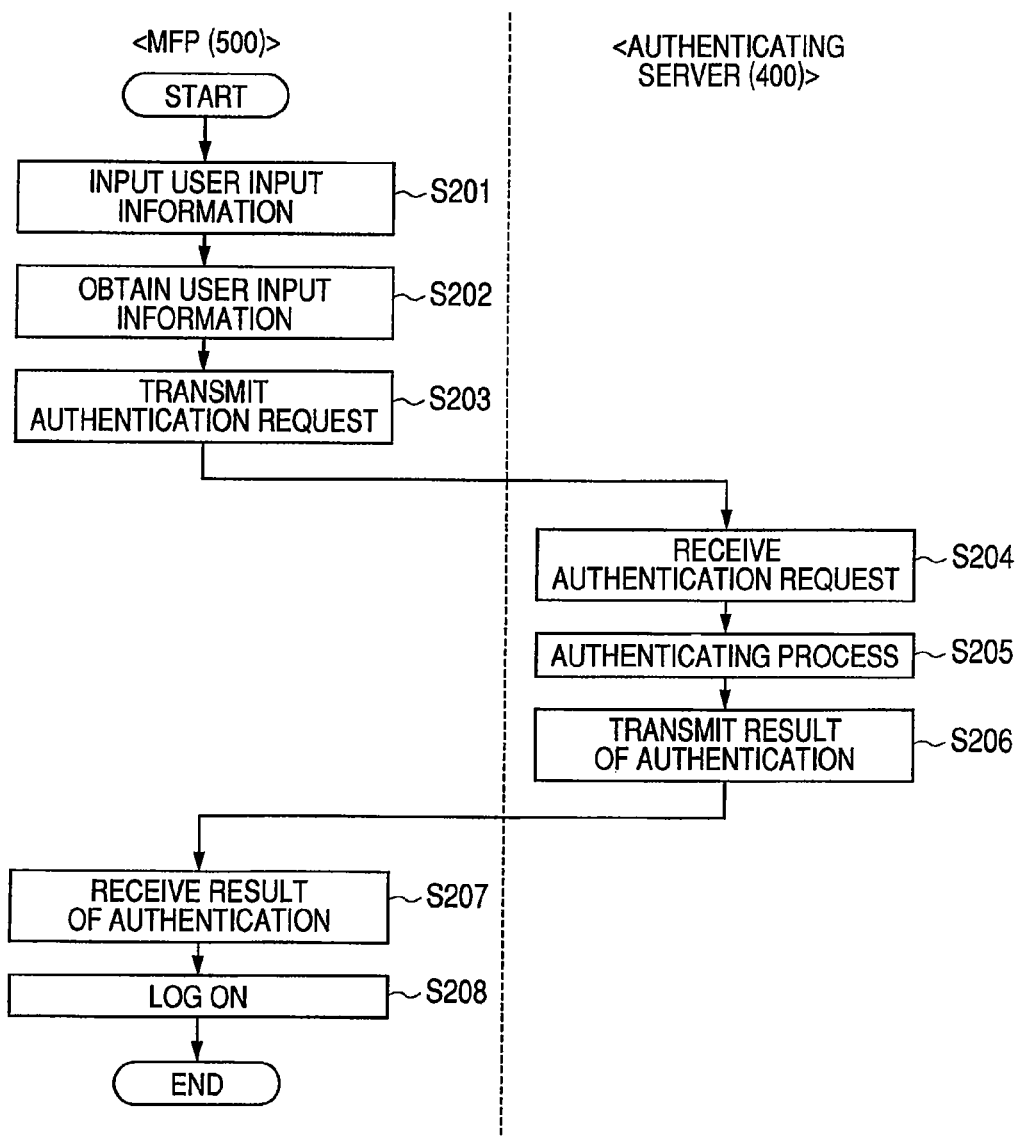
FIG. 10 is a flowchart illustrating an exemplary procedure in an authenticating process of the print controlling system according to the exemplary embodiment of the present invention.

FIG. 10 is a flowchart illustrating an exemplary procedure in the authenticating process of the print controlling system according to the exemplary embodiment of the present invention. Here, in the flowchart illustrated in FIG. 10, the processes in the MFP 500 and the authenticating server 400 are illustrated as vertically-separated.

For example, when the IC card of the user is held over the card reader 340 connected to the MFP 500, and card information (user input information) of the IC card is inputted in the card reader 340, at step S201, the authentication service communicating function unit 552 of the MFP 500 detects the inputted card information.

Next, at step S202, the authentication service communicating function unit 552 of the MFP 500 obtains the user input information from the card reader 340.

Next, at step S203, the authentication service communicating function unit 552 of the MFP 500 transmit the user input information obtained at step S202 to transmit the authenticating request based on such user input information to the authenticating server 400.

Next, at step S204, the user retrieving and usage restriction obtaining function unit 452 of the authenticating server 400 receives the authenticating request transmitted at step S203 from the authentication service communicating function unit 552.

Next, at step S205, the user retrieving and usage restriction obtaining function unit 452 of the authenticating server 400 retrieves the user information stored in the user information DB 40 based on the user input information obtained at step S202, and executes the authenticating process. The retrieving process of such a case is, specifically, executed by referring to the serial ID master table 702 of the user information illustrated in FIGS. 7A and 7B.

Next, at step S206, the user retrieving and usage restriction obtaining function unit 452 of the authenticating server 400 transmits a result (that is, the user information corresponding to the user input information) obtained in the authenticating process at step S205 to the MFP 500.

Next, at step S207, the authentication service communicating function unit 552 of the MFP 500 receives the authentication result (that is, the user information corresponding to the user input information) transmitted at step S206 from the authenticating server 400.

Next, at step S208, the authentication processing function unit 553 of the MFP 500 logs on the corresponding MFP 500 under the authority of the user information received at step S207. After that, the process for the corresponding flowchart is completed.

Through the above processes of step S201 to step S208, the authenticating process is executed based on the user input information inputted by the user.

Figure 11:
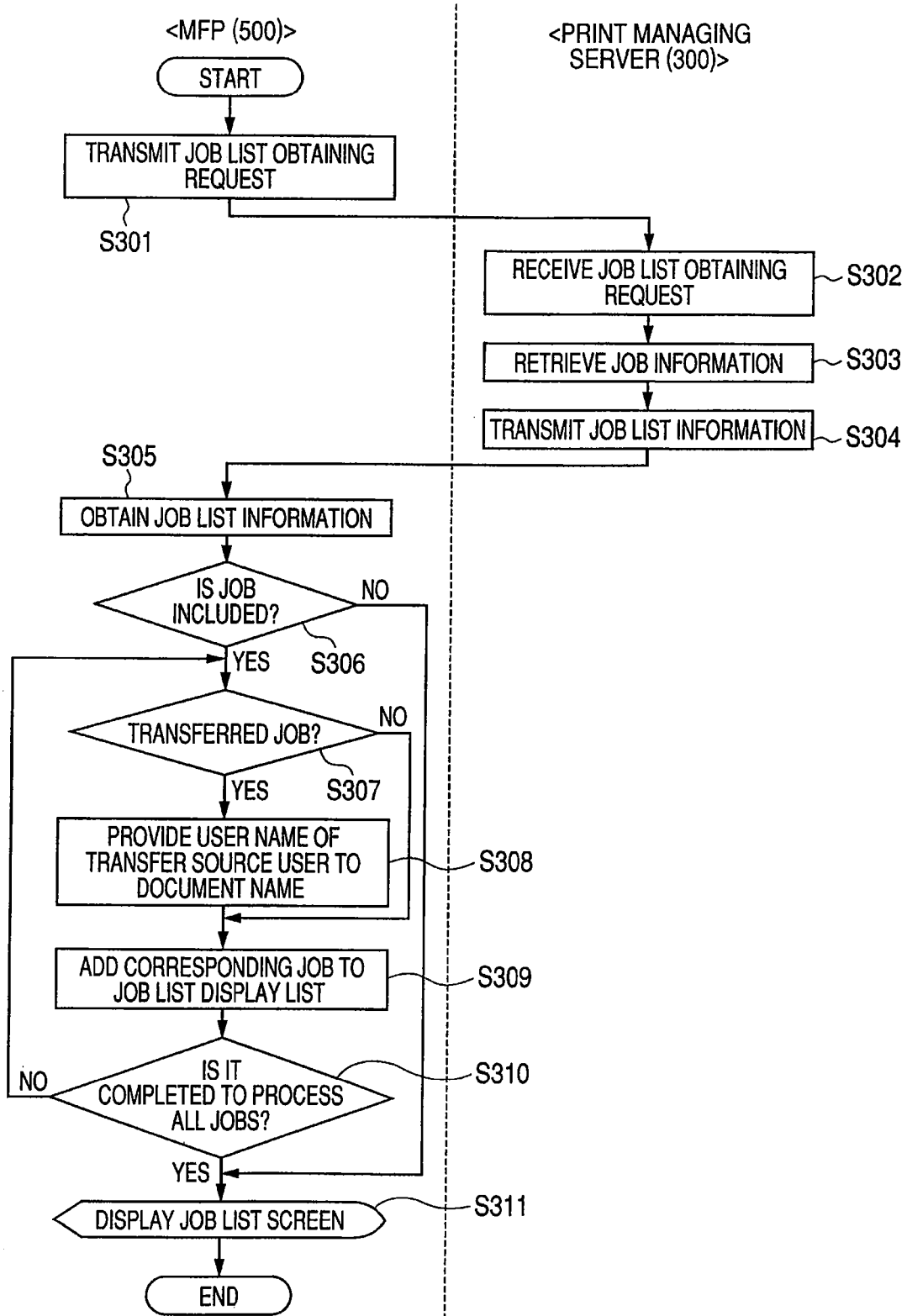
FIG. 11 is a flowchart illustrating an exemplary procedure in a job list displaying process of the print controlling system according to the exemplary embodiment of the present invention.

FIG. 11 is a flowchart illustrating an exemplary procedure in the job list displaying process (print data list displaying process) of the print controlling system according to the exemplary embodiment of the present invention. Here, in the flowchart illustrated in FIG. 11, the processes in the MFP 500 and the print managing server 300 are illustrated as vertically-separated.

First, at step S301, the bibliographic information server communicating function unit (print managing server communicating function unit) 554 of the MFP 500 transmits the user name of the user input information logged on at step S208, and a name of the MFP 500 which is logged on to the print managing server 300 (that is, transmits the job list obtaining request (print data list obtaining request) related to the corresponding user).

Next, at step S302, the print instructing and managing function unit 353 of the print managing server 300 receives the job list obtaining request transmitted at step S301 from the MFP 500.

Next, at step S303, the print instructing and managing function unit 353 of the print managing server 300, according to a content of the job list obtaining request received at step S302, retrieves the job information, which can be output by the corresponding user, for the bibliographic information DB 30 in which the bibliographic information illustrated in FIG. 6 is stored.

Next, at step S304, the print instructing and managing function unit 353 of the print managing server 300 transmits the job list information, which is a list of the job information retrieved at step S303, to the MFP 500. Specifically, the print instructing and managing function unit 353 transmits, to the MFP 500, the job list information, which is a list of the job information for the information excluding the status and the print file name of the bibliographic information illustrated in FIG. 6.

Next, at step S305, the bibliographic information server communicating function unit (print managing server communicating function unit) 554 of the MFP 500 receives and obtains the job list information transmitted at step S304.

Next, at step S306, the job processing function unit 555 of the MFP 500 analyzes the number of jobs of the job list information received at step S305, and determines whether or not such job list information includes the job.

As a result of the determination at step S306, when the job list information includes the job, the process proceeds to step S307. At step S307, the job processing function unit 555 of the MFP 500 analyzes a content of one job information on the job list information received at step S305, and determines whether or not the corresponding job is the transferred job. Here, when any user name is included in the transfer source job owner name of the bibliographic information, which is included in the job list information obtained at step S305 and is illustrated in FIG. 6, it is determined that the corresponding job is the transferred job.

As a result of the determination at step S307, when the corresponding job is the transferred job, the process proceeds to step S308. At step S308, the job processing function unit 555 of the MFP 500 provides the document name with the user name of a transfer source user.

When the process at step S308 is completed, or when the corresponding job is not the transferred job at step S307 (that is, the corresponding job is the job which is output by the corresponding user itself), the process proceeds to step S309. At step S309, the job processing function unit 555 of the MFP 500 adds and registers, for example, the corresponding job to a job list display list generated in the HDD 304.

Next, at step S310, the job processing function unit 555 of the MFP 500 determines whether or not it is completed to process all the jobs of the job list information received at step S305. As a result of such a determination, when it is not completed to process all the jobs of the job list information received at step S305, the process returns to step S307, the processes after step S307 are executed again.

On the other hand, as a result of the determination at step S310, when it is completed to process all the jobs of the job list information received at step S305, or when it is determined at step S306 that the job list information does not include the job, the process proceeds to step S311. At step S311, based on the job list display list managed at step S309, the job processing function unit 555 of the MFP 500 displays the job list screen related to each job on the operation unit 330 which is the user interface (UI). Here, when the job list information does not include the job at step S306, the job is not displayed in the operation unit 330. After that, the process for the corresponding flowchart is completed.

FIG. 12 is a pattern diagram illustrating an example of the job list screen displayed in the operation unit 330 of the MFP 500. A job list screen 1201 illustrated in FIG. 12 displays the document name of each job, the color attribute, the printing method, the page layout (layout), and the date/time of each piece of the job information on the job list information obtained from the print managing server 300. After that, "TANAKA", which indicates the user name of the transfer source user, is added to the job, whose document name is "AAAAAAAA.doc.", of the jobs displayed on the job list screen 1201. In addition, after that, nothing is added to the jobs, whose document names are "BBBBB.txt" and "http://CCCCCCCCCCCC", of the jobs displayed on the job list screen 1201, so that, such a display indicates that such jobs are output by the corresponding user itself. The flowchart illustrated in FIG. 11 is, for example, started by operating an "obtain list" button of the job list screen 1201.

Through the above processes of step S301 to step S311, the job list screen 1201 is displayed in which it is identified whether or not each job is a transferred one.

FIGS. 13A, 13B, 13C-1 and 13C-2 are flowcharts illustrating an exemplary procedure of a job transferring process (a print data transferring process) of the print controlling system according to the exemplary embodiment of the present invention. Here, in the flowcharts illustrated in FIGS. 13A, 13B, 13C-1 and 13C-2, the processes in the MFP 500, the authenticating server 400, the print server 200, and the print managing server 300 are illustrated as vertically-separated.

First, at step S401, the MFP 500 executes the authenticating process illustrated in FIG. 10 with the authenticating server 400.

Next, at step S402, the MFP 500 executes the job list displaying process illustrated in FIG. 11 with the print managing server 300. Thereby, the job list screen 1201 illustrated in FIG. 12 is displayed in the operation unit 330 of the MFP 500.

After that, when the user selects the job, which the user desires to transfer, from the job list screen 1201 illustrated in FIG. 12, and a "transfer" button is, for example, operated, next, at step S403, the job processing function unit 555 of the MFP 500 detects such an operation. In such a case, the user can also select a plurality of the jobs.

Next, at step S404, the job processing function unit 555 of the MFP 500 determines whether or not the job selected at step S403 is the transferred job. In such a case, according to whether or not the user name of the transfer source is provided to the document name at step S308, the job processing function unit 555 determines whether or the job selected at step S403 is the transferred job. For example, in the jobs of the job list screen 1201 illustrated in FIG. 12, the job whose document name is "AAAAAAAA.doc "TANAKA"" corresponds to the transferred job.

As a result of the determination at step S404, when the job selected at step S403 is the transferred job, the process proceeds to step S405. At step S405, the job processing function unit 555 of the MFP 500 adds the corresponding job to a transfer NG list (transfer NG job list). Here, the transfer NG list is generated in the HDD 304 of the MFP 500.

On the other hand, as a result of the determination at step S404, when the job selected at step S403 is not the transferred job (that is, when the corresponding job is output by the corresponding user itself), the process proceeds to step S406. At step S406, the job processing function unit 555 of the MFP 500 adds the corresponding job to a transferable list (transferable job list). Here, the transferable list is generated in the HDD 304 of the MFP 500.

When the process at step S405 is completed, or when the process at step S406 is completed, the process proceeds to step S407. At step S407, the job processing function unit 555 of the MFP 500 determines whether or not it is completed to process all the jobs selected at step S403.

As a result of the determination at step S407, when it is not completed to process all the jobs selected at step S403, the process returns to step S404, and the processes after step S404 are executed again.

On the other hand, as a result of the determination at step S407, when it is completed to process all the jobs selected at step S403, the process proceeds to step S408. At step S408, the job processing function unit 555 of the MFP 500 determines whether or not the transfer NG list (transfer NG job list) generated at step S405 includes the job.

As a result of the determination at step S408, when the transfer NG list generated at step S405 includes the job, the process proceeds to step S409. At step S409, based on the transfer NG list generated at step S405, the job processing function unit 555 of the MFP 500 displays a transfer NG job screen in the operation unit 330 which is the user interface (UI).

Figure 14:
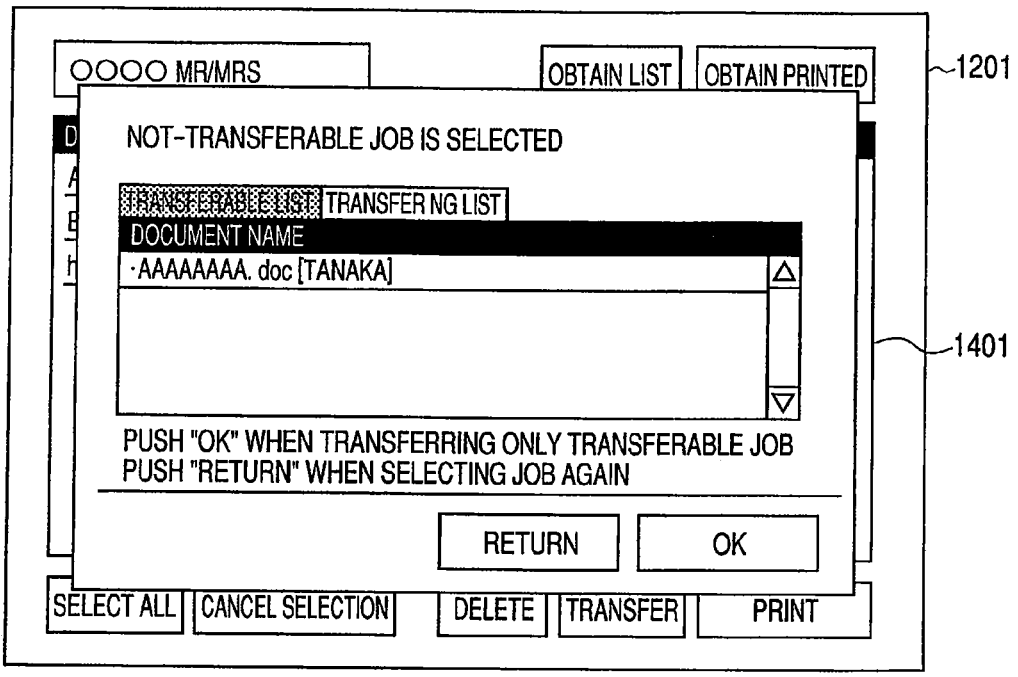
FIG. 14 is a pattern diagram illustrating an exemplary transfer NG job screen displayed in the operation unit of the MFP.

FIG. 14 is a pattern diagram illustrating an example of the transfer NG job screen displayed in the operation unit 330 of the MFP 500. A transfer NG job screen 1401 illustrated in FIG. 14 illustrates the job of "AAAAAAAA.doc "TANAKA"" which is determined at step S404 to be the transferred job of each job of the job list screen 1201 illustrated in FIG. 12.

When the process at step S409 is completed, or when it is determined at step S408 that the transfer NG list does not include the job, the process proceeds to step S410. At step S410, the job processing function unit 555 of the MFP 500 determines whether or not the transferable list (transferable job list) generated at step S406 includes the job.

As a result of the determination at step S410, when the transferable list generated at step S406 does not include the job, the process returns to step S403.

On the other hand, as a result of the determination at step S410, when the transferable list generated at step S406 includes the job, the process proceeds to step S411. At step S411, the authentication service communicating function unit 552 of the MFP 500 communicates with the job processing function unit 555, and transmits an obtaining request for the user list (an obtaining request for a transferable user list) to the authenticating server 400. Meanwhile, according to the obtaining request for such a user list, at after-mentioned step S413, by using the user information (user identifier) included in the obtaining request for such a user list, a group is specified, and the user information is obtained.

Next, at step S412, the user retrieving and usage restriction obtaining function unit 452 of the authenticating server 400 receives the obtaining request for the transferable user list transmitted at step S411 from the authentication service communicating function unit 552.

Next, at step S413, the user retrieving and usage restriction obtaining function unit 452 of the authenticating server 400 retrieves and obtains the user information on a predetermined group (a user group in which the corresponding user is registered) of the corresponding user from the user information registered in the user information DB 40 of the authenticating server 400. Meanwhile, the user information obtained in such a case is not only the user information on the predetermined (partial) group registered in the user information DB 40, but also, may be, for example, the user information on all the users registered in the user information DB 40.

Next, at step S414, the user retrieving and usage restriction obtaining function unit 452 of the authenticating server 400 transmits the user list information based on the user information obtained at step S413 to the MFP 500. The user restriction information illustrated in FIG. 8 is included in each piece of the user information on the user list information transmitted in such a case.

Next, at step S415, the authentication service communicating function unit 552 of the MFP 500 receives and obtains the user list information (transferable user list information) transmitted at step S414 from the authenticating server 400.

Figure 13A:
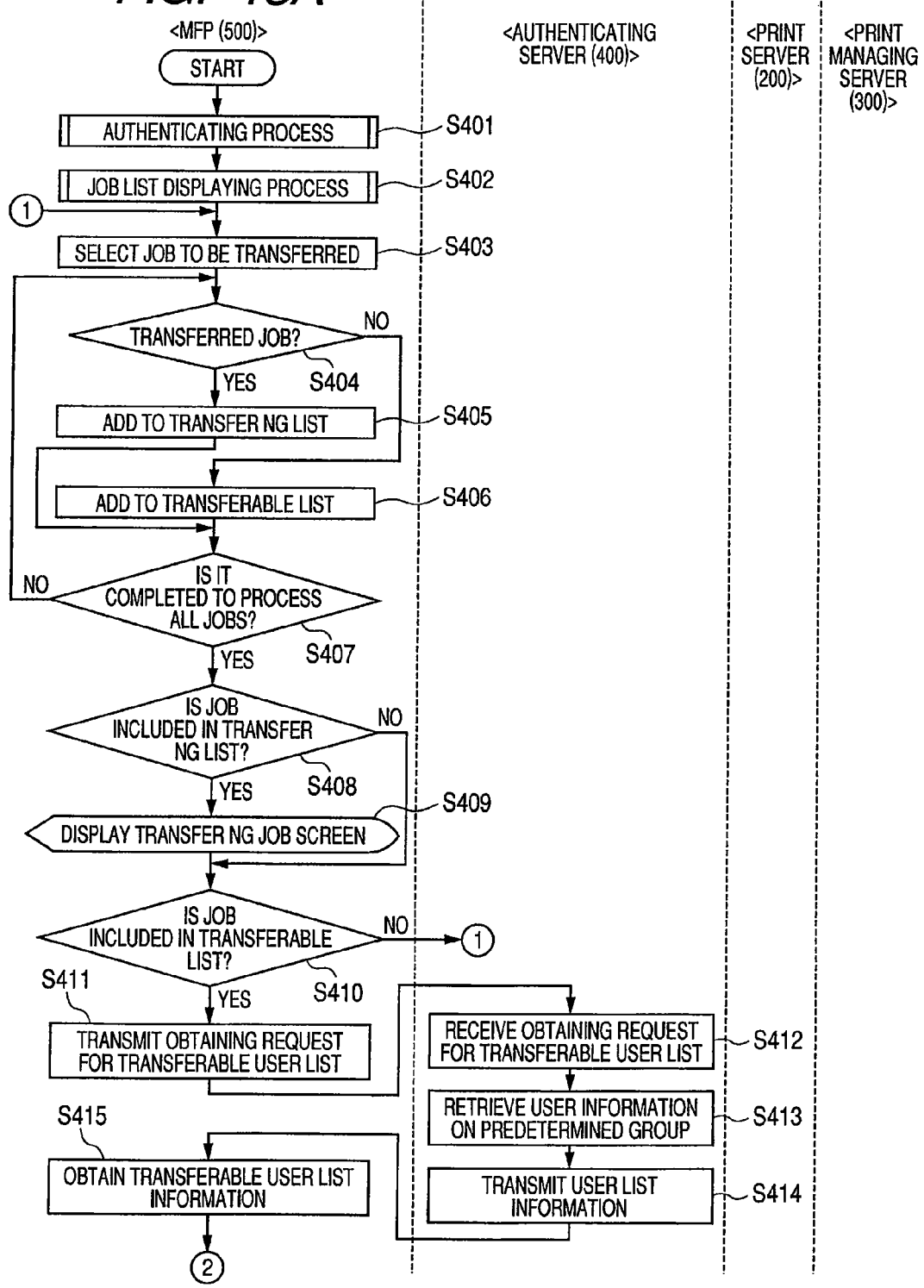
FIG. 13A is a flowchart illustrating an exemplary procedure of a job transferring process of the print controlling system according to the exemplary embodiment of the present invention.
Figure 13B:
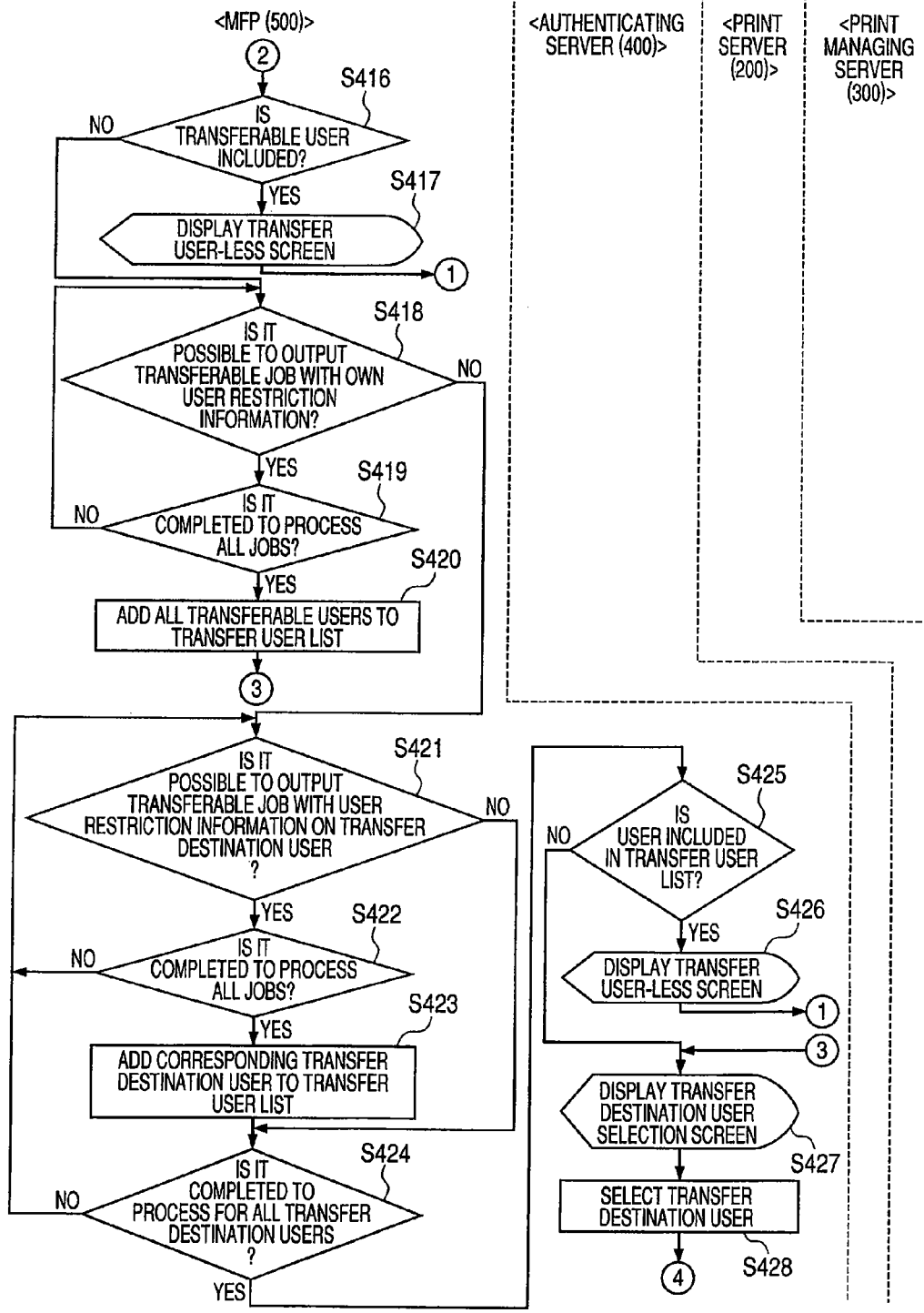
FIG. 13B is a flowchart illustrating an exemplary procedure of the job transferring process of the print controlling system according to the exemplary embodiment of the present invention, as following FIG. 13A.

Next, at step S416 of FIG. 13B, for example, the usage restriction comparing function unit 556 of the MFP 500 determines whether or not the user is included (that is, a transferable user is included) in the user list information (transferable user list information) received at step S415.

As a result of the determination at step S416, when the user is not included in the user list information received at step S415, the process proceeds to step S417. At step S417, for example, the usage restriction comparing function unit 556 of the MFP 500 displays a transfer user-less screen indicating that the transferable user is not included in the operation unit 330 which is the user interface (UI). After that, the process returns to step S403 of FIG. 13A.

Figure 15:
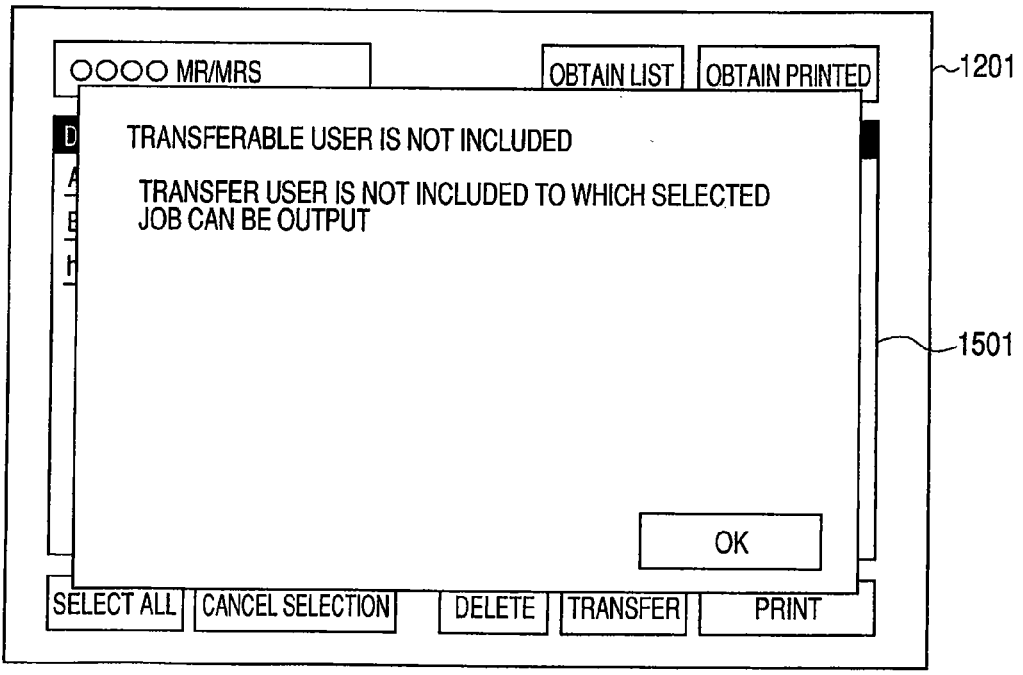
FIG. 15 is a pattern diagram illustrating an exemplary transfer user-less screen displayed in the operation unit of the MFP.

FIG. 15 is a pattern diagram illustrating an example of the transfer user-less screen displayed in the operation unit 330 of the MFP 500. Information on such a fact that the transferable user is not included is indicated in a transfer user-less screen 1501 illustrated in FIG. 15.

On the other hand, as a result of the determination at step S416, when the user is included in the user list information received at step S415, the process proceeds to step S418. At step S418, the usage restriction comparing function unit 556 of the MFP 500 compares one job of the transferable list (transferable job list) generated at step S406 with the own (user authenticated at step S401) user restriction information, and determines whether or not the compared job can be print-output with the own user restriction information. Specifically, the usage restriction comparing function unit 556 of the MFP 500 compares a variety of pieces of information on each job of the job list information obtained at step S305 with the user restriction information (specifically, restriction function items of the printing function 804 of FIG. 8) illustrated in FIG. 8, and as a result of the comparison, when the user restriction information is within the own outputting authority, the usage restriction comparing function unit 556 of the MFP 500 determines that the corresponding job can be print-output.

As a result of the determination at step S418, when one job of the transferable list generated at step S406 can be print-output with the own user restriction information, the process proceeds to step S419.

At step S419, the usage restriction comparing function unit 556 of the MFP 500 determines whether or not it is completed to process all the jobs of the transferable list (transferable job list) generated at step S406. As a result of such a determination, when it is not completed to process all the jobs of the transferable list generated at step S406, the process returns to step S418.

On the other hand, as a result of the determination at step S419, when it is completed to process all the jobs of the transferable list generated at step S406, the process proceeds to step S420. The process proceeds to step S420 only when all the jobs of the transferable list generated at step S406 can be print-output with the own (user authenticated at step S401) user restriction information.

At step S420, for example, the usage restriction comparing function unit 556 of the MFP 500 adds all the users of the transferable user list information received at step S415 to a transfer user list generated in the HDD 304. After that, the process proceeds to step S427.

On the other hand, as a result of the determination at step S418, when one job of the transferable list generated at step S406 cannot be print-output with the own user restriction information, the process proceeds to step S421. The process proceeds to step S421 only when even one job of the transferable list generated at step S406 cannot be output with the own user restriction information.

At step S421, the usage restriction comparing function unit 556 of the MFP 500 compares one job of the transferable list (transferable job list) generated at step S406 with the user restriction information on one transfer destination user indicated in the transferable user list information obtained at step S415, and the usage restriction comparing function unit 556 of the MFP 500 determines whether or not the corresponding job can be print-output with the user restriction information on such a transfer destination user. At step S421, as following the process at S418, the usage restriction comparing function unit 556 of the MFP 500 compares a variety of pieces of information on the corresponding job with the user restriction information on the transfer destination user, and as a result of the comparison, when the user restriction information is within the outputting authority for the transfer destination user, the usage restriction comparing function unit 556 of the MFP 500 determines that the corresponding job can be print-output.

As a result of the determination at step S421, when one job of the transferable list generated at step S406 can be print-output with the user restriction information on one transfer destination user indicated in the transferable user list information obtained at step S415, the process proceeds to step S422.

At step S422, the usage restriction comparing function unit 556 of the MFP 500 determines whether or not it is completed to process all the jobs of the transferable list (transferable job list) generated at step S406. As a result of such a determination, when it is not completed to process all the jobs of the transferable list generated at step S406, the process returns to step S421.

On the other hand, as a result of the determination at step S422, when it is completed to process all the jobs of the transferable list generated at step S406, the process proceeds to step S423. The process proceeds to step S423 only when all the jobs of the transferable list generated at step S406 can be print-output with the user restriction information on the corresponding one transfer destination user.

At step S423, the usage restriction comparing function unit 556 of the MFP 500 adds, for example, one corresponding transfer destination user, in which all the jobs of the transferable list generated at step S406 can be print-output, to the transfer user list generated in the HDD 304. Meanwhile, when a plurality of the transfer destination users are selected, the determination whether or not the job can be output is executed for each of the transfer destination users, and only when all the transfer jobs can be output for one transfer destination user, the usage restriction comparing function unit 556 of the MFP 500 recognizes such a transfer destination user as the transferable user, and adds the recognized transfer destination user to the transfer user list.

When the process at step S423 is completed, or when it is determined at step S421 that even one job of the transferable list cannot be output with the user restriction information on one corresponding transfer destination user, the process proceeds to step S424.

At step S424, the usage restriction comparing function unit 556 of the MFP 500 determines whether or not it is completed to execute the processes for all the transfer destination users indicated in the transferable user list information obtained at step S415. As a result of such a determination, when it is not completed to execute the processes for all the transfer destination users indicated in the transferable user list information obtained at step S415, the process returns to step S421.

On other hand, as a result of the determination at step S424, when it is completed to execute the processes for all the transfer destination users indicated in the transferable user list information obtained at step S415, the process proceeds to step S425. At step S425, foe example, the usage restriction comparing function unit 556 of the MFP 500 determines whether or not the user is included in the transfer user list generated in the HDD 304 (that is, the transferable user is included).

As a result of the determination at step S425, when the user is not included in the transfer user list, the process proceeds to step S426. At step S426, foe example, the usage restriction comparing function unit 556 of the MFP 500 displays the transfer user-less screen 1501 illustrated in FIG. 15, which indicates that the transferable user is not included, in the operation unit 330 which is the user interface (UI). After that, the process returns to step S403 of FIG. 13A.

When it is determined at step S425 that the user is included in the transfer user list, or when the process at step S420 is completed, the process proceeds to step S427. At step S427, for example, the usage restriction comparing function unit 556 of the MFP 500 displays a transfer destination user selection screen in the operation unit 330 which is the user interface (UI) based on the transfer user list generated in the HDD 304.

Figure 16:
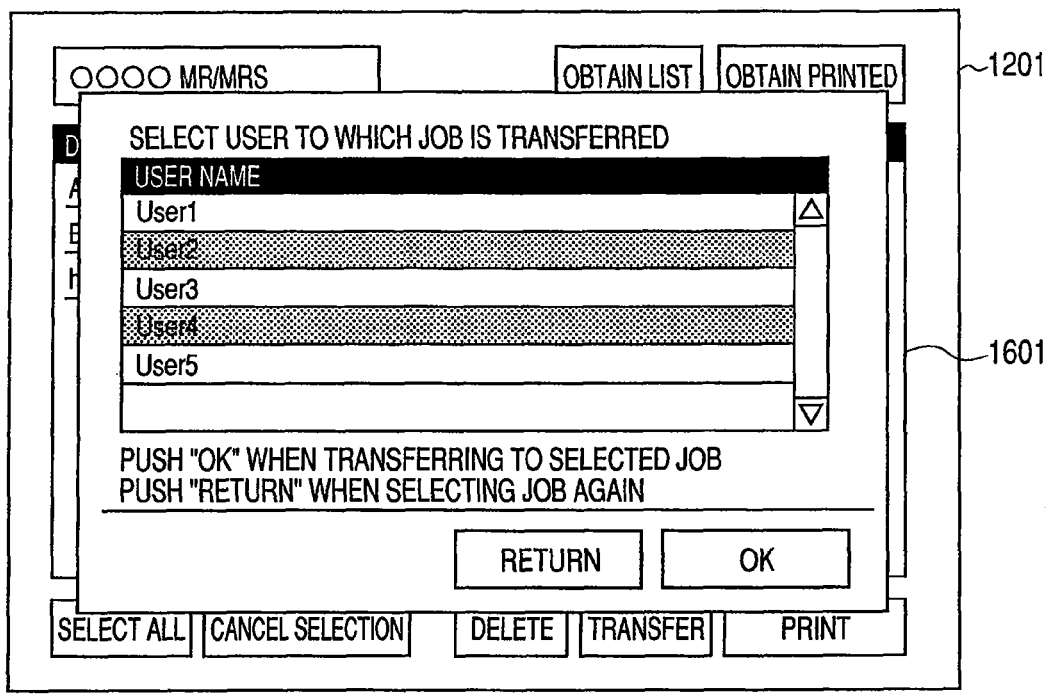
FIG. 16 is a pattern diagram illustrating an exemplary transfer destination user selection screen displayed in the operation unit of the MFP.

FIG. 16 is a pattern diagram illustrating an example of the transfer destination user selection screen displayed in the operation unit 330 of the MFP 500. The transferable user is indicated on a transfer destination user selection screen 1601 illustrated in FIG. 16.

After that, the transfer destination user is selected from the transfer destination user selection screen 1601 illustrated in FIG. 16, and when an "OK" button is, for example, operated, next, at step S428, the bibliographic information server communicating function unit (print managing server communicating function unit) 554 of the MFP 500 detects such an operation.

Figures 2, 13C:
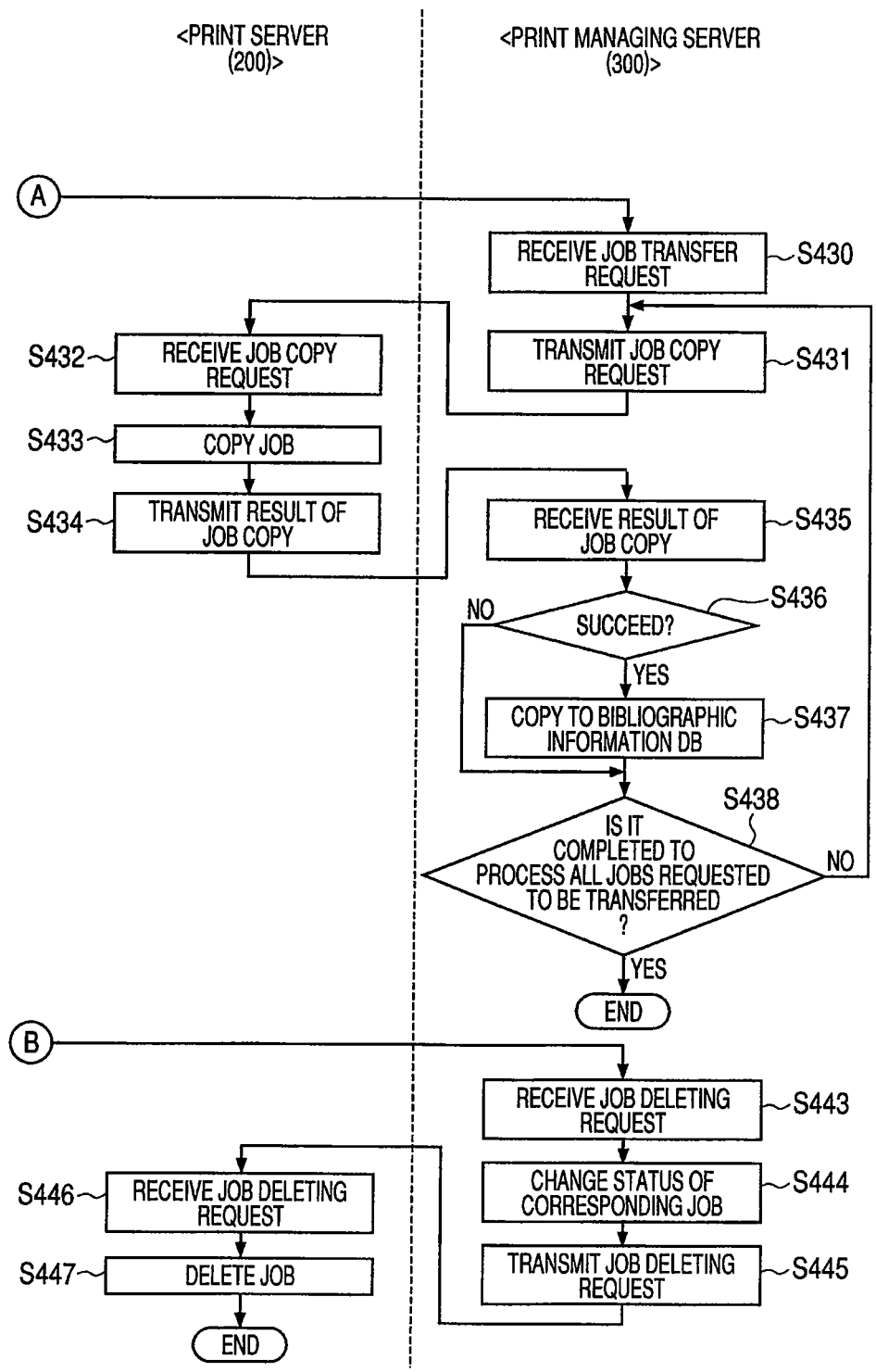
FIG. 13C is comprised of FIGS. 13C-1 and 13C-2 showing flowcharts illustrating exemplary procedures of the job transferring process of the print controlling system according to the exemplary embodiment of the present invention, as following FIG. 13B.

Next, at step S429 of FIG. 13C-1, the bibliographic information server communicating function unit (print managing server communicating function unit) 554 request the print managing server 300 to transfer the job by transmitting, to the print managing server 300, the job information (for example, the time stamp of the corresponding job) on the job to be transferred, and the user information related to the transfer destination user selected at step S428.

At step S429, when the job transferring request is transmitted from the MFP 500 to the print managing server 300, at step S430, the print instructing and managing function unit 353 of the print managing server 300 receives such a job transferring request.

Next, at step S431, based on the job transferring request received at step S430, the print instructing and managing function unit 353 of the print managing server 300 transmits the copying request for the corresponding job to the job copying function unit 253 of the print server 200.

Next, at step S432, the job copying function unit 253 of the print server 200 receives the job copying request transmitted at step S431 from the print managing server 300.

Next, at step S433, based on the job copying request received at step S432, the job copying function unit 253 of the print server 200 executes a copying process for the corresponding job. The job after such a copying process is serialized, the print file name of the corresponding job includes time information when the coping process is completed, and such a time information is substituted for the time stamp (time stamp used for the print file name) of the job of a copy source, and is stored.

Next, at step S434, the job copying function unit 253 of the print server 200 transmits a result of the coping process for the job to the print managing server 300. Specifically, when the coping process for the job has succeeded, the job copying function unit 253 transmits, as the result of the coping process for the job, information including information on the transfer destination user and information on the print file name of the copied job. When the coping process for the job has failed, the job copying function unit 253 transmits an error command as the result of the coping process for the job instead of the information on the print file name.

Next, at step S435, the print instructing and managing function unit 353 of the print managing server 300 receives the result of the coping process for the job transmitted at step S434 from the print server 200.

Next, at step S436, the print instructing and managing function unit 353 of the print managing server 300 analyzes the result of the coping process for the job transmitted from the print server 200, and determines whether or not the coping process for the job has succeeded.

As a result of the determination at step S436, when the coping process for the job has succeeded, the process proceeds to step S437. At step S437, the DB copying function unit 351 of the print managing server 300 copies the bibliographic information (for example, the example 1 of FIG. 6) on the corresponding job, which is stored in the bibliographic information DB 30, rewrites the time stamp, the job owner name, the status, the print file name (destination (file path) in which the file is stored), and the transfer source job owner name (for example, the example 2 of FIG. 6) of the copied bibliographic information, and registers the rewritten information in the bibliographic information DB 30. In such a case, since user identification information on the user which has been currently logged on is stored in the job owner name, the user identification information (user name) is changed to the user identification information on the user designated at step S428. The user identification information on the user which is currently logged on is stored as the transfer source job owner name. The time stamp is also generated based on the date when the copying process is executed, and is added with unique information.

Next, at step S438, the print instructing and managing function unit 353 of the print managing server 300 determines whether or not it is completed to process all the jobs for the job transferring request received at step S430. As a result of such a determination, when it is not completed to process all the jobs for the job transferring request received at step S430, the process returns to step S431, and the processes after step S431 are executed again.

On the other hand, as a result of the determination at step S438, when it is completed to process all the jobs for the job transferring request received at step S430, the process for the corresponding flowchart is completed.

In the MFP 500, after the job transfer request is transmitted to the print managing server 300 at step S429, next, at step S429, based on the job which is requested to be transferred, the job processing function unit 555 of the MFP 500 generates, for example, a deletable job list in the HDD 304, and displays, based on the deletable list, a transfer completion screen in the operation unit 330 which is a user interface (UI).

Figure 17:
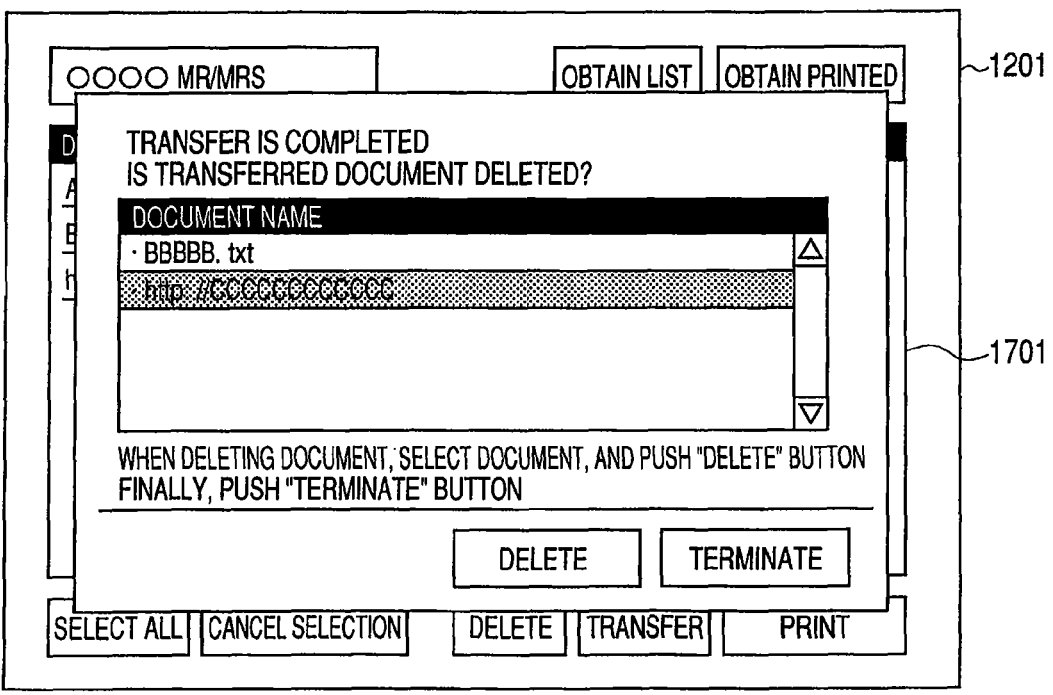
FIG. 17 is a pattern diagram illustrating an exemplary transfer completion screen displayed in the operation unit of the MFP.

FIG. 17 is a pattern diagram illustrating an example of the transfer completion screen displayed in the operation unit 330 of the MFP 500. The deletable job list is displayed on a transfer completion screen 1701 illustrated in FIG. 17.

After that, when the job to be deleted is selected from the deletable job list of the transfer completion screen 1701 illustrated in FIG. 17, next, at step S440, the job processing function unit 555 of the MFP 500 detects such a selection.

Next, at step S441, the job processing function unit 555 of the MFP 500 determines whether or not the user has issued an instruction for deleting the job. Here, after job to be deleted is selected at step S440, and when detecting that a "delete" button of the transfer completion screen 1701 illustrated in FIG. 17 is, for example, operated, the job processing function unit 555 of the MFP 500 determines that the instruction for deleting the job has been issued.

As a result of the determination at step S441, when the user has issued an instruction for deleting the job, the process proceeds to step S442. At step S442, the bibliographic information server communicating function unit (print managing server communicating function unit) 554 of the MFP 500 transmits the job information on the job selected at step S440 to the print managing server 300, and request the print managing server 300 to delete the corresponding job.

When the job deleting request is transmitted at step S442 from the MFP 500 to the print managing server 300, at step S443, the print instructing and managing function unit 353 of the print managing server 300 receives such a job deleting request.

Next, at step S444, the print instructing and managing function unit 353 of the print managing server 300 changes the status of the bibliographic information on FIG. 6 related to the job of the job deleting request received at step S443 to "2 (deleted)".

Next, at step S445, the print instructing and managing function unit 353 of the print managing server 300 transmits the job deleting request received at step S443 to the print server 200.

Next, at step S446, the job deleting function unit 255 of the print server 200 receives the job deleting request transmitted at step S445.

Next, at step S447, the job deleting function unit 255 of the print server 200 deletes the job (print data) related to the job deleting request received at step S446 from the print data storing unit 20. After that, the process for the corresponding flowchart is completed.

In the MFP 500, after the job deleting request is transmitted to the print managing server 300 at step S442, next, at step S448, the job deleting function unit 255 of the print server 200 deletes the job selected at step S440 from the deletable job list generated at step S439.

Next, at step S449, the job deleting function unit 255 of the print server 200 determines whether or not the job is included in the deletable job list. As a result of such a determination, when the job is included in the deletable job list, the process returns to step S439, and after the current deletable job list is update-displayed, the processes after step S440 are executed again.

On the other hand, when it is determined at step S449 that the job is not included in the deletable job list, or when it is determined at step S441 that the instruction for deleting the job is not issued from the user (for example, when a "terminate" button of the transfer completion screen 1701 illustrated in FIG. 17 is operated), the process for the corresponding flowchart is completed.

Through the above processes of step S401 to step S449, the job selected by the user is transferred.

Figure 18A:
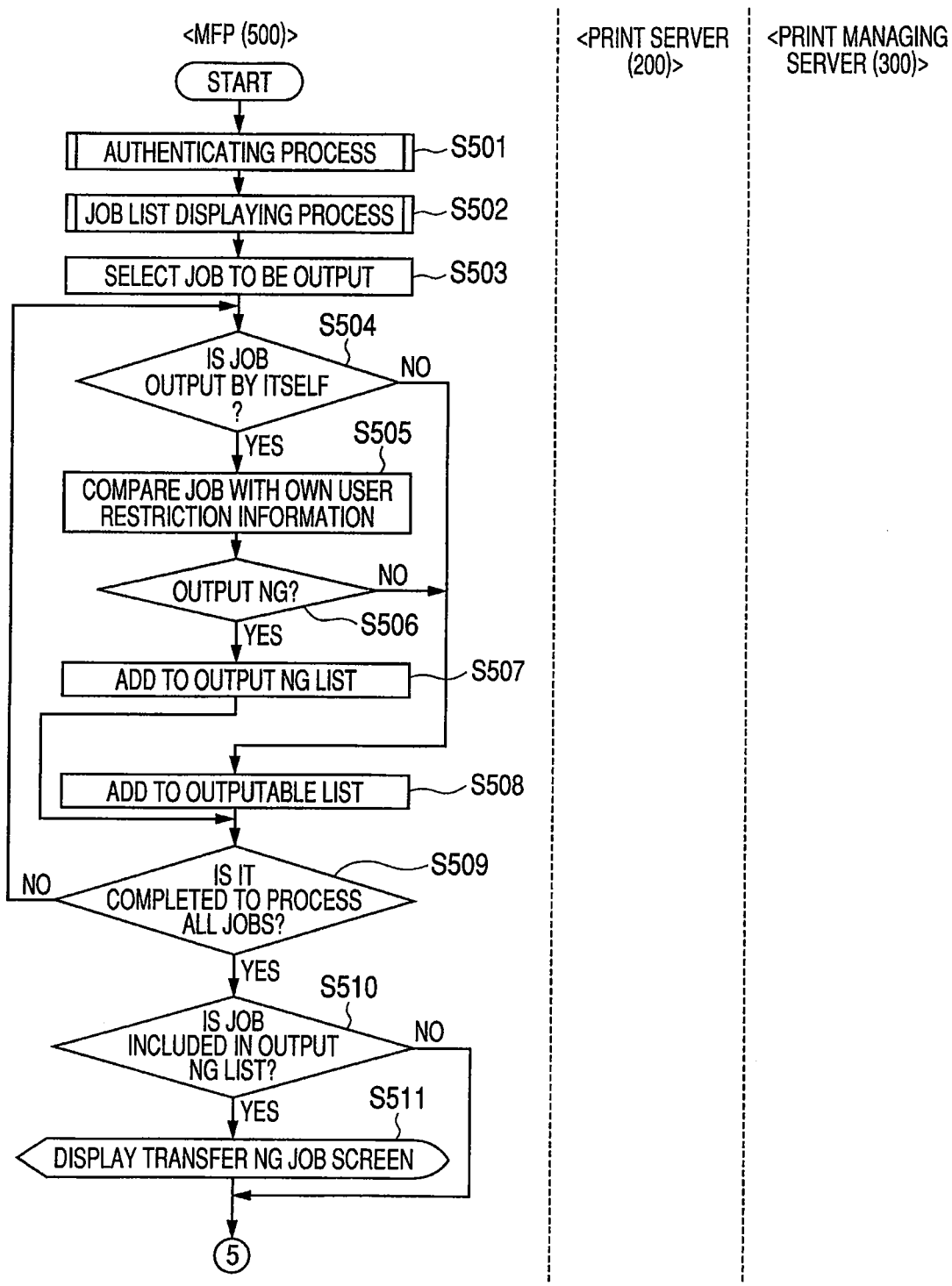
FIG. 18A is a flowchart illustrating an exemplary procedure of a job outputting process of the print controlling system according to the exemplary embodiment of the present invention.
Figure 18B:
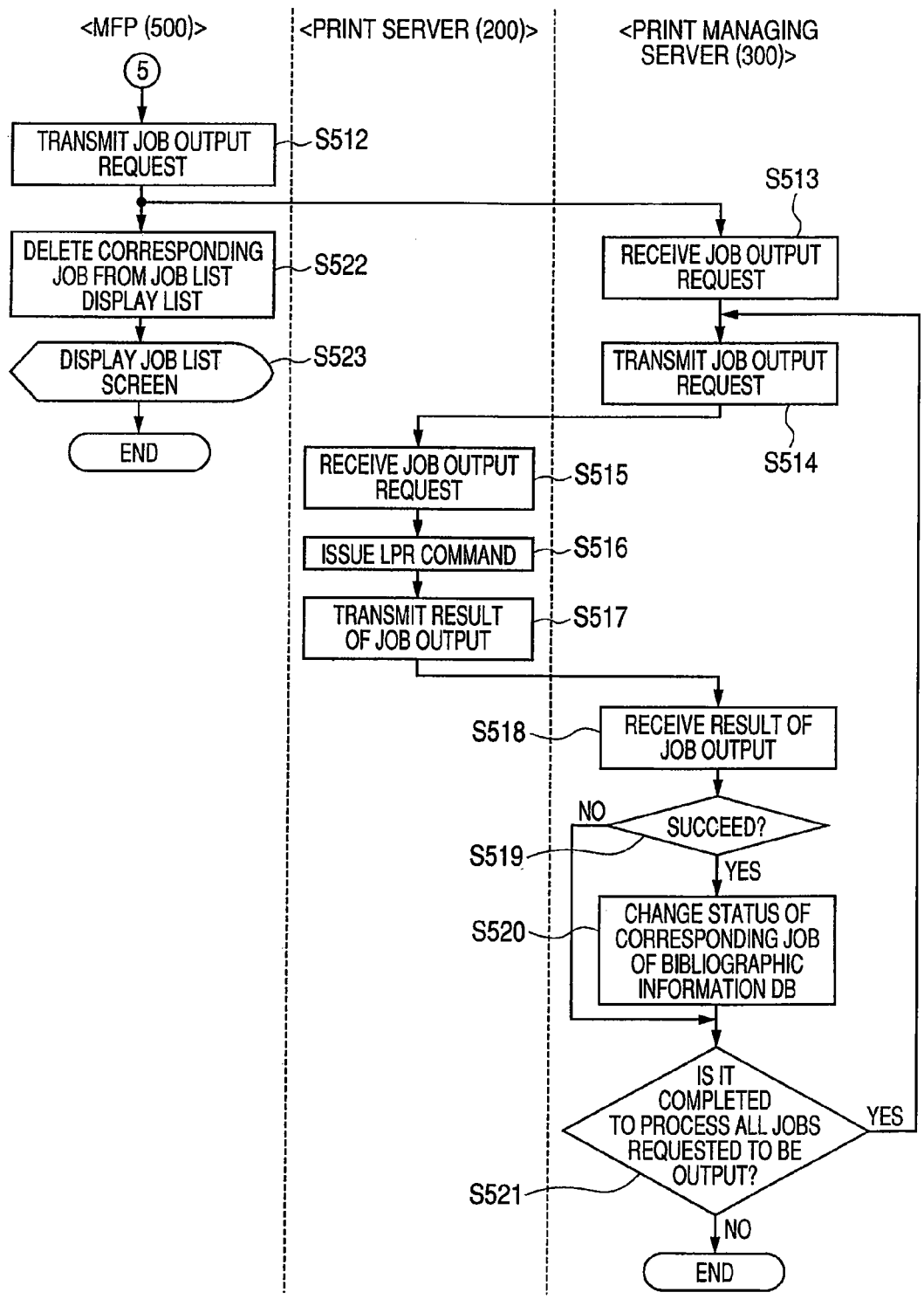
FIG. 18B is a flowchart illustrating an exemplary procedure of the job outputting process of the print controlling system according to the exemplary embodiment of the present invention, as following FIG. 18A.

FIGS. 18A and 18B are flowcharts illustrating an exemplary procedure of a job outputting process (a print data outputting process) of the print controlling system according to the exemplary embodiment of the present invention. Here, in the flowcharts illustrated in FIGS. 18A and 18B, the processes in the MFP 500, the print server 200, and the print managing server 300 are illustrated as vertically-separated.

First, at step S501, the MFP 500 executes the authenticating process illustrated in FIG. 10 with the authenticating server 400.

Next, at step S502, the MFP 500 executes the job list displaying process illustrated in FIG. 11 with the print managing server 300. Thereby, the job list screen 1201 illustrated in FIG. 12 is displayed in the operation unit 330 of the MFP 500.

After that, when the job to be print-output is selected by the user from the job list screen 1201 illustrated in FIG. 12, and a "print" button is, for example, operated, next, at step S503, the job processing function unit 555 of the MFP 500 detects such an operation. In such a case, the user can also select a plurality of the jobs.

Next, at step S504, the job processing function unit 555 of the MFP 500 determines whether or not the job selected at step S503 is the job output by itself (the user which has executed the authenticating process at step S501). In such a case, according to whether or not the transfer source user name is attached to the document name, the job processing function unit 555 determines whether or not the job selected at step S503 is the job output by itself. For example, in the job of the job list screen 1201 illustrated in FIG. 12, the jobs whose document names are "BBBBB.txt" and "http://CCCCCCCCCCCC" correspond to the jobs output by itself (the corresponding user).

As a result of the determination at step S504, when the job selected at step S503 is the job output by itself, the process proceeds to step S505. At step S505, the usage restriction comparing function unit 556 of the MFP 500 compares such a job with the own (user which has executed the authenticating process at step S501) user restriction information. Specifically, the usage restriction comparing function unit 556 of the MFP 500 compares a variety of pieces of information on each job of the job list information obtained at step S305, with the user restriction information illustrated in FIG. 8. In such a case, when the user restriction information is within the own outputting authority, the corresponding job can be output.

Next, at step S506, as a result of the comparison at step S505, the usage restriction comparing function unit 556 of the MFP 500 determines whether or not the corresponding job can be output with the own (user which has executed the authenticating process at step S501) user restriction information.

As a result of the determination at step S506, when the corresponding job cannot be output with the own user restriction information, the process proceeds to step S507. When the process proceeds to step S507, the corresponding job is output by itself, but, cannot be print-output with the own user restriction information. At step S507, for example, the job processing function unit 555 of the MFP 500 adds the corresponding job to an output NG list (output NG job list). Here, the output NG list is generated in the HDD 304 of the MFP 500.

On the other hand, as a result of the determination at step S504, when the job selected at step S503 is not the job output by itself, or when the corresponding job can be output at step S506 with the own user restriction information, the process proceeds to step S508. At step S508, for example, the job processing function unit 555 of the MFP 500 adds the corresponding job to an outputable list (outputable job list). Here, the outputable list is generated in the HDD 304 of the MFP 500.

Meanwhile, when it is determined at step S504 that the corresponding job is not the job output by itself, that is, when it is determined that the corresponding job is the transferred job, the transferred job is added to the outputable list under such a condition that, when the corresponding job is transferred in the transferring processes illustrated in FIGS. 13A, 13B, 13C-1 and 13C-2, the corresponding job is determined to be able to be output by the user which is authenticated at step S501.

When the process at step S508 is completed, or when the process at step S507 is completed, the process proceeds to step S509. At step S509, the job processing function unit 555 of the MFP 500 determines whether or not it is completed to process all the jobs selected at step S503.

As a result of the determination at step S509, when it is not completed to process all the jobs selected at step S503, the process returns to step S504, and the processes after step S504 are executed again.

On the other hand, as a result of the determination at step S509, when it is completed to process all the jobs selected at step S503, the process proceeds to step S510. At step S510, the job processing function unit 555 of the MFP 500 determines whether or not the job is included in the output NG list (output NG job list) generated at step S507.

As a result of the determination at step S510, when the job is included in the output NG list generated at step S507, the process proceeds to step S511. At step S511, based on the output NG list generated at step S507, the job processing function unit 555 of the MFP 500 displays an output NG job screen in the operation unit 330 which is the user interface (UI).

Figure 19:
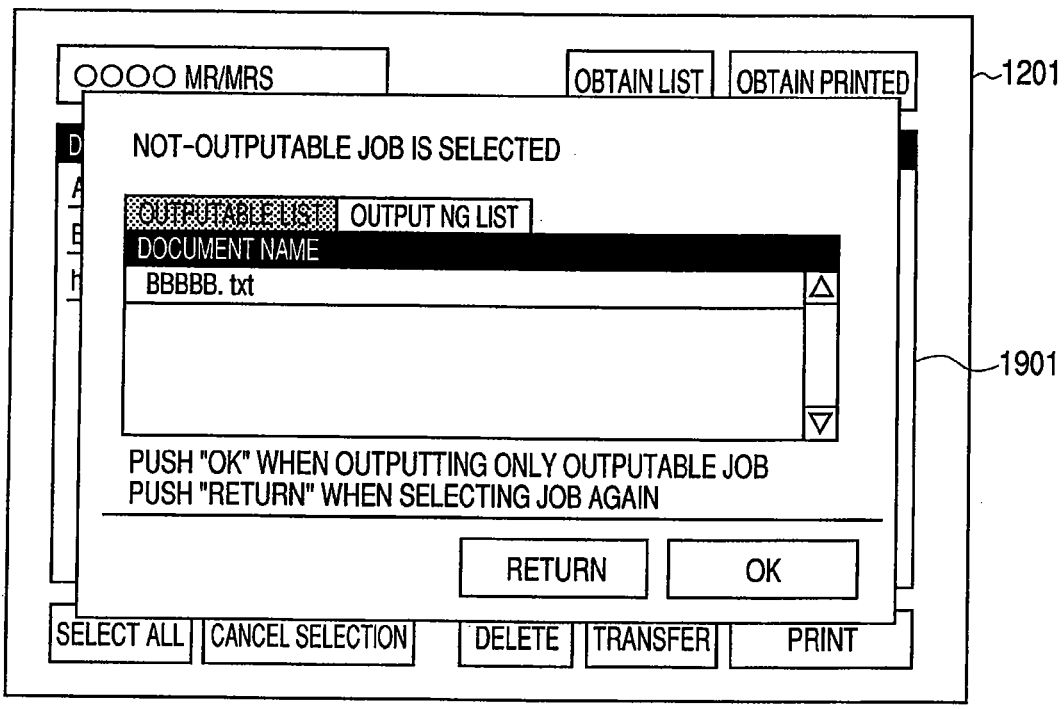
FIG. 19 is a pattern diagram illustrating an exemplary output NG job screen displayed in the operation unit of the MFP.

FIG. 19 is a pattern diagram illustrating an example of the output NG job screen displayed in the operation unit 330 of the MFP 500. In each job of the job list screen 1201 illustrated in FIG. 12, the output NG job screen illustrated in FIG. 19 illustrates the job, whose document name is "BBBBB.txt", as the output NG job.

When the process at step S511 is completed, or when it is determined at step S510 that the job is not included in the output NG list, to issue an output request for the job which is not the output NG, that is, which is the job of the outputable job list generated at S508, the process proceeds to step S512 of FIG. 18B.

At step S512 of FIG. 18B, the bibliographic information server communicating function unit (print managing server communicating function unit) 554 of the MFP 500 generates a command for a job output request for outputting the job of the outputable list (outputable job list) generated at step S508, and transmits the generated command to the print managing server 300.

When the job output request is transmitted at step S512 from the MFP 500 to the print managing server 300, at step S513, the print instructing and managing function unit 353 of the print managing server 300 transmits the command for such a job output request.

Next, at step S514, the print instructing and managing function unit 353 of the print managing server 300 analyzes the command for the job output request received at S513, and transmits the job output request configured with the IP address of the MFP 500 and the time stamp of the job to the print executing function unit 254 of the print server 200.

Next, at step S515, the print executing function unit 254 of the print server 200 receives the job output request transmitted from the print managing server 300.

Next, at step S516, the print executing function unit 254 of the print server 200 issues the LPR command based on the job output request (IP address of the MFP 500 which is an output destination, and the time stamp of the job) received at S515.

Next, at step S517, the print executing function unit 254 of the print server 200 transmits the success and failure for issuing the LPR command (that is, a job output result) to the print instructing and managing function unit 353 of the print managing server 300.

Next, at step S518, the print instructing and managing function unit 353 of the print managing server 300 receives the job output result transmitted from the print server 200.

Next, at step S519, based on the job output result received at step S518, the print instructing and managing function unit 353 of the print managing server 300 determines whether or not the print-output for the job has succeeded.

When it is determined at step S519 that the print-output for the job has succeeded, the process proceeds to step S520. At step S520, the DB registering function unit 352 of the print managing server 300 changes the status of the bibliographic information on the corresponding job stored in a process information DB. Specifically, the DB registering function unit 352 changes the status of the bibliographic information illustrated in FIG. 6 to "3 (printed)".

When the process at step S520 is completed, or when it is determined at step S519 that the print-output for the job has succeeded, the process proceeds to step S521. At step S521, the print instructing and managing function unit 353 of the print managing server 300 determines whether or not it is completed to process all the jobs for the job output request received at step S513. As a result of such a determination, when it is not completed to process all the jobs for the job output request received at step S513, the process returns to step S514, and the processes after step S514 are executed again.

On the other hand, as a result of the determination at step S521, when it is completed to process all the jobs for the job output request received at step S513, the processes of the corresponding flowchart are completed.

In the MFP 500, after the job output request is transmitted to the print managing server 300 at step S512, next, at step S522, the job processing function unit 555 of the MFP 500 deletes the corresponding job, in which the output request has been executed, from the job list display list generated at step S309, and updates the job list display list.

Next, at step S523, based on the job list display list updated at step S522, the job processing function unit 555 of the MFP 500 displays the job list screen related to each job in the operation unit 330 which is the user interface (UI). After that, the processes of the corresponding flowchart are completed.

Through the above processes of step S501 to step S523, the job selected by the user is print-output.

As described above, the print controlling system 1 of the present exemplary embodiment is configured with the print managing server 300A for storing the print data, the bibliographic information including the user identification information (for example, the job owner name illustrated in FIG. 6) on the user including such print data and the print data identification information (for example, the time stamp illustrated in FIG. 6) for identifying such print data, and the user information on a plurality of the users, and the MFP 500 which is a printing apparatus for print-outputting the print data.

The following steps are executed in the MFP 500: a receiving step (S201) of receiving the user input information inputted from the user; a first obtaining step (S301 and S305) of transmitting such user input information to the print managing server 300A, and obtaining, from such a print managing server 300A, list information on the print data including the print data identification information related to the print data which can be print-output by a user corresponding to the user input information; a second obtaining step (S411 and S415) of obtaining the list information on the user information from the print managing server 300A; a first selecting step (S403 including S503) of selecting the print data to be print-output to other user from the print data indicated by the list information on the print data obtained by the first obtaining step; a second selecting step (S418 to S428) of selecting, from the list information on the user information obtained by the second obtaining step, the user information on the user which permits the print data selected by the first selecting step to be print-output; and an information transmission controlling step (S429) of transmitting, to the print managing server 300A, the print data identification information on the print data selected by the first selecting step and the user information selected by the second selecting step. On the other hand, the following steps are executed in the print managing server 300A; a first transmission controlling step (S302 to S304) of, according to the user input information inputted by the MFP 500, transmitting, from the bibliographic information, to the MFP 500, the list information (job list information) of the print data including the print data identification information related to the print data which can be print-output by the user corresponding to the user input information; a second transmission controlling step (S414) of, according to a request from the MFP 500, transmitting the list information (user list information) of the user information to the MFP 500; a receiving controlling step (S430) of receiving, from the MFP 500, the print data identification information on the print data selected by the first selecting step, and the user information selected by the second selecting step; and a registering step (S435 to S437) of registering the user identification information corresponding to the user information received by the receiving controlling step as the user which can print-output the print data corresponding to the print data identification information received by the receiving controlling step. In such a configuration, even the user other than the user, which outputs the print data, can also easily print-output such print data from the desired printing apparatus with the security, and without the restriction for the print output.

The following step is also executed in the MFP 500: a user information display controlling step (S427, FIG. 6) of list-displaying the user information on the user, for which the print data selected by the first selecting step can be transferred, from the list information on the user information obtained by the second obtaining step. The user information includes the user restriction information, in which the usage restriction for each function included by the MFP 500 is defined for each user, and which is illustrated in FIG. 8. The following step is also executed in the MFP 500: a print-output determining step (S504 to S506) of, when the print data selected by the first selecting step is print-output, according to the user restriction information on the user corresponding to the user input information, determining whether or not such print data can be print-output. When the print data selected by the first selecting step is the print data transferred from other user, the print-output determining step does not determine, based on the user restriction information on the other user, whether or not the print data can be print-output (S504/NO). The following step is also executed in the MFP 500: a print data list display controlling step (S311) of displaying the list information on the print data obtained by the first obtaining step. The print data list display controlling step displays the print data transferred from other user so that such print data can be identified ("AAAAAAAA.doc "TANAKA"" in FIG. 12). The following step is also executed in the MFP 500: a transfer controlling step (S404 and S405) of prohibiting the print data transferred from other user to be transferred to further other user.

In the print controlling system 1 of the present exemplary embodiment, since the transfer destination user is, for example, selected from the operation unit 330 of the MFP 500, the print data can be output to such a transfer destination user, so that the operation efficiency is improved. In the transfer destination user selection screen 1601 illustrated in FIG. 16, only the transferable (the job can be output) user is displayed, so that such a disadvantage is not induced that the user, to which the job is transferred, cannot print-out after the job is transferred. In the print controlling system 1 of the present exemplary embodiment, the job to be transferred is copied (S433), so that the job to be transferred itself can be also output. When the job is transferred, the usage restriction information for the transfer source user and the transfer destination user are considered (S418 to S424), so that the transfer destination user can also output the job beyond the own (such a transfer destination user) authority.

Each function unit of FIG. 4 configured in each apparatus of the print controlling system 1 according to the above present exemplary embodiment, and each step of FIGS. 9, 10, 11, 13A, 13B, 13C-1, 13C-2 and 18 indicating the print controlling method for such a print controlling system 1 can be realized since a CPU of a computer executes a program stored in the external memory 211, the ROM 303, or the HDD 304. Such a program and a computer-readable storing medium recording such a program are included in the present invention.

Specifically, the above program is recorded in the storing medium such as a CD-ROM, or is provided to the computer through a variety of transfer media. The following storing media can be used in addition to the CD-ROM as the storing medium recoding the above program: a flexible disk; a hard disk; a magnetic tape; a magnetic-optical disk; and a nonvolatile memory card. On the other hand, as the transfer medium for the above program, a communication medium can be used, which is used in the computer network (LAN, WAN such as the Internet, and a wireless communication network) system for propagating program information as a carrier wave to supply the program information. In such a case, a wire line such as an optical fiber and a wireless line correspond to the communication medium.

In the exemplary embodiment of the present invention, while the job is copied in a job transferring process (S433), such a method may be executed that the job is not copied, only the bibliographic information, which is stored in the bibliographic information DB 30, on such a job is copied, and one job data is linked to a plurality of pieces of the bibliographic information. In such a case, when the transfer destination user deletes the job, and when a plurality of the transfer destinations are selected, the user other than the user which has issued a deleting instruction cannot output such a job. Thus, only a content of the bibliographic information is changed for a job deleting instruction of the transfer destination user, and the status of the bibliographic information corresponding to the printed job is changed to "3 (printed)", and when the statuses of all the pieces of the bibliographic information linked to the job are changed to "3 (printed)", the job may be deleted. The job can be deleted from the transfer source user, and only when the job deleting instruction is received from the transfer source user, such a job may be deleted.

According to the present exemplary embodiment, when the print job, which is temporarily stored, is output, an output request can be made only to the print job of the user which logs on the MFP 500.

Thereby, for example, when the printed matter is provided to other user, the user print-outputs the printed matter by itself to provide the printed matter to other user, and it is not necessary to transmit the print data itself to other user.

The present invention is not limited to such an aspect that, since the computer executes the supplied program, the function of the print controlling system 1 according to the present exemplary embodiment is realized. Even when, since the program co-operates with the OS (Operating System) running on the computer or other application software, the function of the print controlling system 1 according to the present exemplary embodiment is realized, such a program is also included in the present invention. Even when, since all or a part of the processes of the supplied program are executed by a function expansion board or a function expansion unit of the computer, the function of the print controlling system 1 according to the present exemplary embodiment is realized, such a program is also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-246116, filed Sep. 21, 2007, which is hereby incorporated by reference in its entirety.

The invention claimed is:
1. A print controlling system comprising:
a print managing server for storing print data, bibliographic information including user identification information about a user owning the print data and print data identification information for identifying the print data, and user information related to a plurality of users; and
a printing apparatus for print-outputting the print data,
wherein the printing apparatus comprises:
a receiving unit configured to receive user input information inputted from a user;
a first obtaining unit configured to obtain from the print managing server, in accordance with the user input information received by the receiving unit, list information about the print data that includes the print data identification information related to the print data which can be print-output by the user corresponding to the user input information;
a second obtaining unit configured to obtain list information about the user information from the print managing server;
a first selecting unit configured to select print data to be print-output to another user from among the print data indicated by the list information about the print data obtained by the first obtaining unit;
a second selecting unit configured to select, from the list information about the user information obtained by the second obtaining unit, the user information about the user which permits the print data selected by the first selecting unit to be print-output; and an information transmission controlling unit configured to transmit, to the print managing server, the print data identification information about the print data selected by the first selecting unit and the user information selected by the second selecting unit, wherein the print managing server comprises:

a first transmission controlling unit configured to transmit to the printing apparatus, in accordance with the user input information inputted by the printing apparatus, the list information, from the bibliographic information, about the print data including the print data identification information related to the print data which can be print-output by the user corresponding to the user input information;

a second transmission controlling unit configured to transmit to the printing apparatus, in accordance with a request from the printing apparatus, the list information about the user information;

a receiving controlling unit configured to receive, from the printing apparatus, the print data identification information about the print data selected by the first selecting unit, and the user information selected by the second selecting unit; and a registering unit configured to register the user identification information corresponding to the user information received by the receiving controlling unit as the user which can print-output the print data corresponding to the print data identification information received by the receiving controlling unit;

wherein the user information includes user restriction information in which usage restriction for each function included in the printing apparatus is defined for each user, and wherein the printing apparatus further comprises a print output determining unit configured to determine, when the print data selected by the first selecting unit is print-output, whether or not the print data can be print-output, according to the user restriction information about the user corresponding to the user input information, and wherein the print data indicated by the list information about the print data, the list information being obtained by the first obtaining unit, includes the print data output by the user which inputs the user input information, and the print data transferred from a user other than the user, and wherein, when the print data selected by the first selecting unit is the print data transferred from the other user, the print output determining unit does not determine whether or not the print data can be print-output, according to the user restriction information about the other user.

2. The print controlling system according to claim 1, wherein, when the print data transferred from the other user can be, at least, print-output with the authority corresponding to the user restriction information about the other user, or when the print data transferred from the other user can be print-output with the authority based on the user restriction information about the user which inputs the user input information, the print data transferred from the other user is transferred from the other user to the user which inputs the user input information.

3. The print controlling system according to claim 1, wherein the printing apparatus further comprises a print data list display controlling unit configured to display the list information about the print data obtained by the first obtaining unit, and wherein the print data list display controlling unit distinguishably displays the print data transferred from the other user.

4. The print controlling system according to claim 1, wherein the printing apparatus further comprises a transfer controlling unit configured to prohibit the print data transferred from the other user from being transferred to a further other user.

5. A print controlling method for a print controlling system including a print managing server for storing print data, bibliographic information including user identification information about a user owning the print data and print data identification information for identifying the print data, and user information related to a plurality of users, and a printing apparatus which print-outputs the print data, wherein the print controlling method executes in the printing apparatus:

a receiving step of receiving user input information inputted from a user;

a first obtaining step of obtaining from the print managing server, in accordance with the user input information received in the receiving step, the list information about the print data including the print data identification information related to the print data which can be print-output by the user corresponding to the user input information;

a second obtaining step of obtaining the list information about the user information from the print managing server;

a first selecting step of selecting the print data to be print-output to another user from among the print data indicated by the list information about the print data obtained in the first obtaining step;

a second selecting step of selecting, from the list information about the user information obtained in the second obtaining step, the user information about the user which permits the print data selected in the first selecting step to be print-output; and an information transmission controlling step of transmitting, to the print managing server, the print data identification information about the print data selected in the first selecting step and the user information selected in the second selecting step, and wherein the print controlling method executes in the print managing server:

a first transmission controlling step of transmitting the printing apparatus, in accordance with the user input information inputted by the printing apparatus, the list information, from the bibliographic information, about the print data including the print data identification information related to the print data which can be print-output by the user corresponding to the user input information;

a second transmission controlling step of transmitting to the printing apparatus, in accordance with a request from the printing apparatus, the list information about the user information;

a receiving controlling step of receiving, from the printing apparatus, the print data identification information about the print data selected in the first selecting step, and the user information selected in the second selecting step; and a registering step of registering the user identification information corresponding to the user information received in the receiving controlling step as the user which can print-output the print data corresponding to the print data identification information received in the receiving controlling step;

wherein the user information includes user restriction information in which usage restriction for each function included in the printing apparatus is defined for each user, and wherein the printing apparatus further performs a print output determining step that determines, when the print data selected in the first selecting step is print-output, whether or not the print data can be print-output, according to the user restriction information about the user corresponding to the user input information, and wherein the print data indicated by the list information about the print data, the list information being obtained in the first obtaining step, includes the print data output by the user which inputs the user input information, and the print data transferred from a user other than the user, and wherein, when the print data selected in the first selecting step is the print data transferred from the other user, the print output determining step does not determine whether or not the print data can be print-output, according to the user restriction information about the other user.

6. A program stored in a non-transitory computer-readable medium for causing a computer to execute a print controlling method in a print controlling system including a print managing server for storing print data, bibliographic information including user identification information about a user owning the print data and print data identification information for identifying the print data, and user information related to a plurality of users, and a printing apparatus which print-outputs the print data, wherein the program causes the computer to execute in the printing apparatus:
 a receiving step of receiving user input information inputted from a user;
 a first obtaining step of obtaining from the print managing server, in accordance with the user input information received in the receiving step, the list information about the print data including the print data identification information related to the print data which can be print-output by the user corresponding to the user input information;
 a second obtaining step of obtaining the list information about the user information from the print managing server;
 a first selecting step of selecting the print data to be print-output to another user from among the print data indicated by the list information about the print data obtained in the first obtaining step;
 a second selecting step of selecting, from the list information about the user information obtained in the second obtaining step, the user information about the user which permits the print data selected in the first selecting step to be print-output; and
 an information transmission controlling step of transmitting, to the print managing server, the print data identification information about the print data selected in the first selecting step and the user information selected in the second selecting step, and wherein the program causes the computer to execute in the print managing server:
 a first transmission controlling step of transmitting to the printing apparatus, in accordance with the user input information inputted by the printing apparatus, from the list information, from the bibliographic information, about the print data including the print data identification information related to the print data which can be print-output by the user corresponding to the user input information;
 a second transmission controlling step of transmitting to the printing apparatus, in accordance with a request from the printing apparatus, the list information about the user information;
 a receiving controlling step of receiving, from the printing apparatus, the print data identification information about the print data selected in the first selecting step, and the user information selected in the second selecting step; and
 a registering step of registering the user identification information corresponding to the user information received in the receiving controlling step as the user which can print-output the print data corresponding to the print data identification information received in the receiving controlling step;

wherein the user information includes user restriction information in which usage restriction for each function included in the printing apparatus is defined for each user, and wherein the printing apparatus further performs a print output determining step that determines, when the print data selected in the first selecting step is print-output, whether or not the print data can be print-output, according to the user restriction information about the user corresponding to the user input information, and wherein the print data indicated by the list information about the print data, the list information being obtained in the first obtaining step, includes the print data output by the user which inputs the user input information, and the print data transferred from a user other than the user, and wherein, when the print data selected in the first selecting step is the print data transferred from the other user, the print output determining step does not determine whether or not the print data can be print-output, according to the user restriction information about the other user.

\* \* \* \* \*